(12) United States Patent
Sasu

(10) Patent No.: US 10,926,818 B1
(45) Date of Patent: Feb. 23, 2021

(54) POOLING VEHICLE AND TRAILER SYSTEM

(71) Applicant: Ioan Sasu, Brossard (CA)

(72) Inventor: Ioan Sasu, Brossard (CA)

(73) Assignee: Ioan Sasu, Brossard (CA)

( * ) Notice: Subject to any disclaimer, the term of this patent is extended or adjusted under 35 U.S.C. 154(b) by 0 days.

(21) Appl. No.: 16/548,691

(22) Filed: Aug. 22, 2019

(51) Int. Cl.
| | | |
|---|---|---|
| B62D 59/04 | (2006.01) |
| B62D 13/02 | (2006.01) |
| B60R 11/04 | (2006.01) |
| B60K 1/02 | (2006.01) |
| B60K 1/04 | (2019.01) |
| B60K 17/36 | (2006.01) |
| B62D 13/06 | (2006.01) |
| B60K 17/04 | (2006.01) |

(52) U.S. Cl.
CPC .............. B62D 59/04 (2013.01); B60K 1/02 (2013.01); B60K 1/04 (2013.01); B60R 11/04 (2013.01); B62D 13/02 (2013.01); *B60K 17/043* (2013.01); *B60K 17/36* (2013.01); *B60K 2001/0444* (2013.01); *B60L 2200/28* (2013.01); *B62D 13/06* (2013.01)

(58) Field of Classification Search
CPC ...... B62D 13/02; B62D 15/025; B62D 59/04; B60K 1/02
See application file for complete search history.

(56) References Cited

U.S. PATENT DOCUMENTS

| | | | | |
|---|---|---|---|---|
| 10,108,202 | B1* | 10/2018 | Aikin | .................... G05D 1/0293 |
| 10,245,972 | B2* | 4/2019 | Healy | ........................ B60L 1/02 |
| 2012/0193153 | A1* | 8/2012 | Wellborn | ............... B62D 59/04 180/14.2 |
| 2012/0193154 | A1* | 8/2012 | Wellborn | ............... B62D 59/04 180/14.2 |
| 2019/0217831 | A1* | 7/2019 | Viele | ........................ B60D 1/30 |
| 2019/0233034 | A1* | 8/2019 | Viele | ........................ B60D 1/36 |
| 2019/0291593 | A1* | 9/2019 | Healy | ..................... B60L 8/003 |
| 2019/0299732 | A1* | 10/2019 | Smith | ................. B62D 33/0222 |

\* cited by examiner

*Primary Examiner* — Kevin Hurley

(57) ABSTRACT

The invention provides a new design of an intelligent pooling vehicle and trailer system equipped with an intelligent pooling vehicle and an intelligent electric powered trailer capable to improve the efficiency of the system, avoid off-tracking and make the system more user friendly. The rear powered tires train is capable to turn around a pivot, taking different positions with respect to the trailer. The independent electric motors on each tire of the trailer rear tires train provide additional power to the vehicle and steering capability of the trailer rear tires train. This allows better control of the rear of the trailer and instead to be only pull by the truck, the trailer may be driven by it self, by using different speeds on each of the two tires, avoiding accidents and helping back parking and driving. The system may work in automatic or manual mode.

12 Claims, 35 Drawing Sheets

Detail D1

POOLING VEHICLE AND TRAILER SYSTEM

TECHNICAL FIELD

The present invention relates generally to a new design of pooling vehicle and trailer system, comprising an intelligent pooling vehicle (IPV) and an intelligent electric powered trailer (IEPT) capable to improve the efficiency of the system, to avoid off-tracking in tight intersections and make the system more user friendly. The trailer rear powered tires train is capable to turn around a pivot, taking different positions with respect to the trailer. The rear powered tires train of the trailer is equipped with independent electric motors, gear box and inverter for each side providing additional power to the vehicle and steering capability of the trailer rear powered tires train. This allows better control of the rear of the trailer. Instead to be only pull by the truck, the trailer may be driven by it self, by using different speeds on each of the two side tires, avoiding accidents and helping back parking and back driving. This system may be used with electric vehicles (EV) or IC vehicles, allowing as well to improve the truck & trailer performances regarding the start running and the slopes climbing and also providing a better control of the rear tires of the trailer in intersections and "U" turns, avoiding accidents and helping the fluidity of the traffic. The use of these intelligent electric powered trailers (IEPT) gives also the opportunity to save the braking energy during the vehicle stops or during the downhill slopes by reversing the electric motor into an electric generator, recharging the trailer battery. The system may work in automatic or manual mode for the pivoting trailer rear powered tires train, making the system more user friendly.

This design may be applied with the same advantages to any kind of trailer, from the very heavy trailers attached to the heavy duty trucks to the light trailers attached to cars or SUV's. This invention takes advantage of the great innovations in the computer science and in the communication field, by integrating automate manoeuvring of the trailer with the GPS system via Internet and with the computer calculation, in order to obtain a very user friendly truck and trailer system.

BACKGROUND OF THE ART

In this time, there is a vast variety of trailers, depending on their use, weight and dimensions. Nowadays, generally the trailers are not electric, they are not capable to bring additional power to the pulling vehicle they and they are not able to participate to the manoeuvring in any situation. Up to now, the development of trailers was on customized applications and on their size. They became bigger and bigger, generating important problems of manoeuvring and safety.

Because of these, the truck drivers have been developed exceptional skills in order to drive correctly and avoid accidents on any kind of trailer.

Lately, new patent applications and patent were issued, with electric powered trailers, capable to bring additional power, some trailer becoming autonomous. Also, introducing a plurality of sensors, they may be controlled by the controller systems, via communication system, etc.

In the patent US20190233034, Viele proposes a semi-autonomous trailer hauler, which in fact is not a real trailer, it is a trailer hauler, following a pilot vehicle.

The actual invention aims a trailer configured in a way to increase its maneuverings capability by using a pivoting intelligent electric powered rear tires train. In this way, the trailer is able to participate to complex maneuverings, independent of the pooling vehicle, having steering capabilities by two independent powered rear tires of the rear powered tires train. (which can run at different speed each other) and by its pivoting rear powered tires train (which may take different positions with respect to the trailer in order to obtain the optimum trajectory in tight intersections, "U" turns and back driving and back parking maneuverings).

TECHNICAL ISSUES

The issues related to actual trailers are related to their poor maneuvering capability, which consists in difficult turns into tight intersections and "U" turns, as well as in back driving and back parking. The maneuvering capability depends on the length of the trailers: longer the trailer is poorer maneuvering. A better control of the trailer rear tires train trajectory may avoid accidents related to off-tracking.

SUMMARY OF THE INVENTION

The invention provides a new design of an intelligent pooling vehicle and trailer system using electric trailers equipped with two independent electric motors on the rear tires (one on each side of the trailer).

For the long trailers, which are more difficult to control, in order to avoid accidents by off-tracking, the rear tires powered train is installed on a ring, capable to turn around a pivot in horizontal plan, taking a different angular positions with respect to the trailer axis. In this way the rear tires of the trailer may become steering tires and instead to be only pulled by the truck, they may drive the trailer on different trajectories, by using different speeds on each of the two powered tires. This capability allows a better control during the trailer turns into tight intersections or on "U" turns, avoiding accidents and helping the fluidity of the traffic. It helps as well the back driving and the back parking, increasing the maneuverings accuracy and reducing the parking time.

In order to better control the trailer path and to avoid any interference, on the trailer are installed a plurality of cameras capable to take pertinent information on both sides and on the rear of the trailer. This information is sent to the computed power control system of the vehicle to be analyzed and to be taken into consideration in the calculation.

The computed power control system of the vehicle is connected to the Internet, having information on the configuration of the road by using GPS system. In this way it can anticipate the truck and trailer trajectory and can calculate the best trajectory of the rear tires of the trailer into the intersections, in order to avoid off-tracking or accidents. For the back driving or back parking, the driver sets the target and the computer calculates the best trajectory of the vehicle and the trailer, based on the information received from the plurality of cameras mounted on the trailer. The computed power control system of the vehicle takes control of both trailer motors and after unlocking the trailer pivot, the rear tires train of the trailer becomes a steering train, and by using different speeds of the two rear tires, it will drive the trailer to reach the target.

The two independent electric motors on the rear tires (one on each side of the trailer) are capable to provide additional power to the vehicle (EV or IC) in order to help the start running and the slope climbing of the vehicle. This design allows an efficient vehicle breaking when stopping or on the downhill slopes, when, the electric motor changes in an electric generator, recharging the trailer battery. Depending on the requested power, these independent electric motors will be activated or not, or they will be changed into electric generators during the braking and downhill driving.

This is an intelligent pooling vehicle and trailer system, being capable:
- to take advantage of the electric powered rear tires train of the trailer in order to increase its maneuverings capability, its efficiency and making it more user friendly;
- to analyze any moment the actual situation by its image analysis system and by the GPS capability;
- to make computation and optimization in order to find the best trajectory of the pooling vehicle and of the trailer;
- to control the electric powered rear tires train of the trailer and change from one mode to another allowing to the trailer to work in different modes like: motor/generator mode of each engine, forward/backward steering mode, automate/manual mode;
- to ensure an appropriate communication between all the system components, via a communication system, The battery installed on the trailer is not necessary to be recharged from an external source. It will be recharged on the trailer by changing the electric motors into a generator during the breaking, during the downhill slopes or simply, if necessary, on easy portions of the road.

This new design of electric trailers gives them the opportunity to become the "active players" in goods transportation.

DESCRIPTION OF THE DRAWINGS

In order that this invention may be readily understood, a plurality of embodiments are illustrated by way of examples, with reference to the accompanying drawings, in which.

DETAILED DESCRIPTION OF PREFERRED EMBODIMENTS

Figure 1:
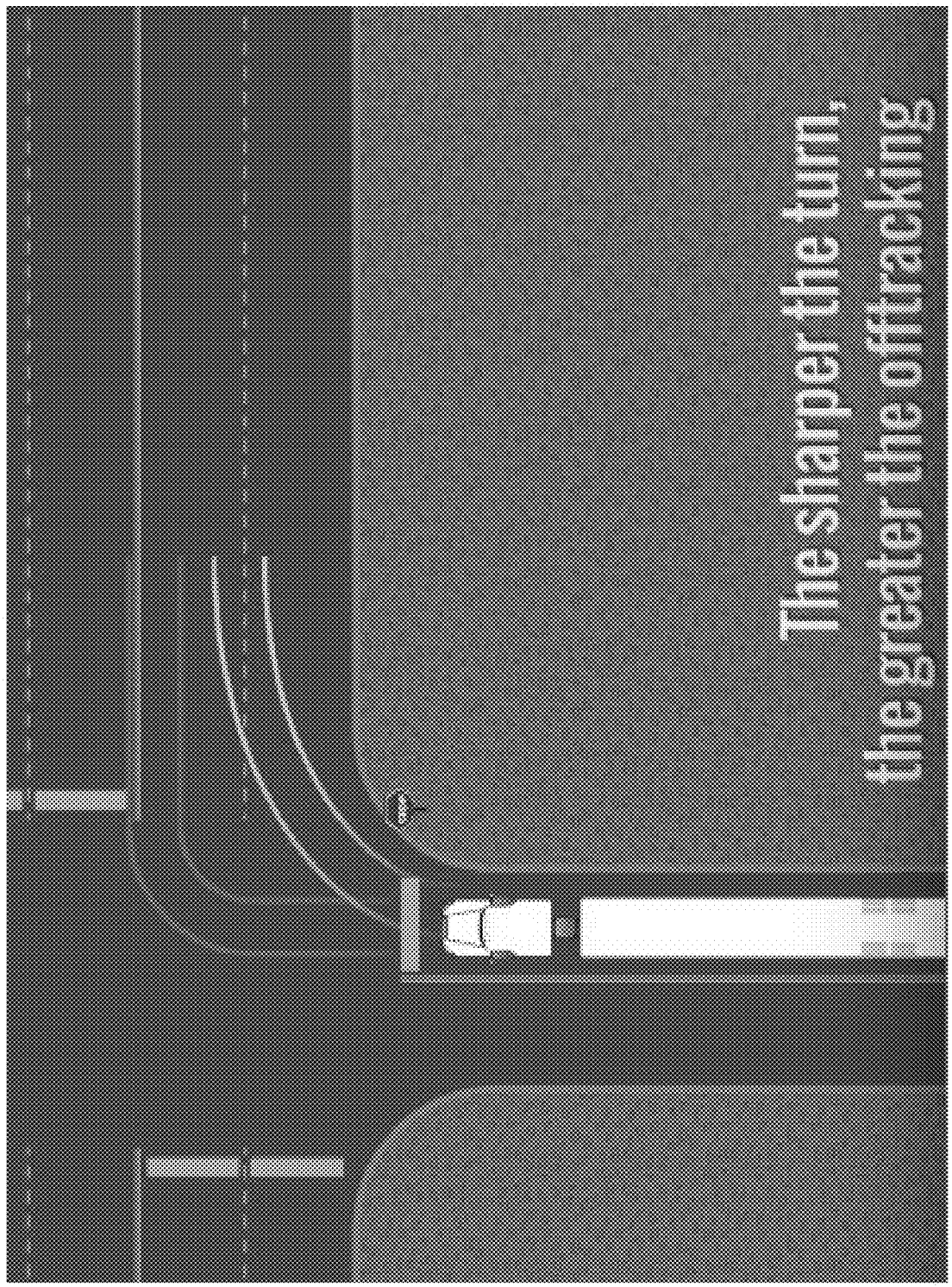
FIG. 1 is a picture of the actual trailers into an intersection, showing the trajectory of the truck and the trailer tires.

The huge variety of trailers in use may be classified upon of many criterion depending on their utility, depending on the kind of truck they are attached to, depending on their size, depending on their weight, etc. However the kind of trailer, the weight and the length of the trailer remain the main characteristics, which define their maneuvering.

Heavier the trailer is, more difficult will be to pull it, especially when the vehicle starts and when it is climbing slopes. On these two particular situations, having additional power will be helpful. More than that, if this extra power comes from the rear of the trailer it is even better, because by pushing, it discharges all the structure of the pulling vehicle (car, SUV or truck), facilitating the driving. The invention proposes a solution providing a pooling vehicle and trailer system design, where the rear tires train of the trailer is equipped with independent electric motors for each side. Using these electric motors, depending on the requested torque, the computed power control system of the vehicle connects or disconnects these electric motors and in this way the entire system is working more efficiently. More than that, during the braking or on the downhill driving, the computed power control system of the vehicle switches the electric motors of the trailer into an electricity generator, which generates extra electric current, charging the trailer battery. The trailer battery is not necessary to be recharged using an external source, because of the following considerations: The trailer motors are not permanently in use, by braking and downhill driving the battery is recharged automatically and in case when is needed, the trailer battery may be recharged on easy portion of the road, by switching it into an electric generator.

Longer the trailer is, more difficult is its maneuverings. In the actual design, where the trailers are pooled by another vehicle, the trailer rear tires train follows the pooling vehicle, without any possibility of steering. Because that, for all trailers, but especially for the very long trailers, the maneuvering into the intersections, in "U" turns and in back driving and back parking becomes very difficult, generating in many cases off-tracking and even accidents, more often for bicycles. The invention proposes a solution providing a powered rear tires train trailer design, where the rear tires train of the trailer has steering capabilities by using an electric powered axle. Having independent electric motor on each rear tire side and the capability to control each motor speed by the computed power control system of the vehicle, turning the rear tires with different speeds, the rear tires train becomes a steering train, capable to change the trajectory of the trailer independently of the pooling vehicle. This steering capability helps a lot even for the short trailer during the back driving and the back parking (especially because for short trailers the drivers are not very experimented and their skills are limited). For short trailers, the rear tires train may be attached to the trailer structure by a no-rotating mechanism via the suspension system of the vehicle, without any other design change. The only difference consists in the fact that this rear tires train is powered by the two electric motors. For the very long trailers, which require very complicated maneuverings, see FIG. 1 and FIG. 2, the rear tires train of the trailer is capable to turn around a pivot in a horizontal plan with respect to the trailer axis. This is a pivoting rear tires train trailer version. In this design, the pivot consists in two concentric rings capable to turn concentrically—a supporting ring and a pivoting ring. The supporting ring is attached to the trailer frame and the pivoting ring is attached to the pivoting assembly frame, which is attached to the powered axis assembly via a suspension system. In order to ensure the security, these two rings are maintained in contact by two attaching semi-rings, which are solidly attached to the pivoting ring and are sliding on the supporting ring. In this way, the rear side of the trailer may take different trajectories by it self, helping the maneuverings. This sliding rotation of the two rings is allowed only at the slow speed and in difficult maneuverings situations. In the majority of time, the two rings are kept rigidly together by a locking mechanism.

Depending on the size of the trailer, there are two categories of the powered rear tires trains: no-rotating powered rear tires trains (for small and medium trailers) and pivoting powered rear tires trains (for very long trailers). The no-rotating powered rear tires trains are no-rotating attached to the trailer structure, there is not any need for small and medium length trailer to drive the trailer rear side on the turns, so there is not need to change the powered rear tires trains position with respect to the trailer. However, even in this version, the trailers maintain their steering capability for back driving and back parking by controlling the speed of the two powered rear tires. The pivoting powered rear tires trains, as they were described herein, are attached to the trailer structure via a pivoting rear tires train mechanism (PRTTM)—allowing to change the relative position of the powered rear tires trains with respect to the trailer axis, in this way increasing the maneuverings capability of the trailer.

Depending on the trailer weight, there are single powered rear tires axis trains and tandem powered rear tires trains (many rear tires axis trains) for heavy duty trailers.

For a better control, a plurality of cameras are installed on the trailers, taking information and sending this infoiIation to the computed power control system of the vehicle. Based on this information, the computed power control system of the vehicle analyzes and calculates the best trajectory of the trailer, controls each tire speed and controls the locking and unlocking mechanism for pivoting powered rear tires trains. For the automate back driving and the back parking, the driver has just to set the target on the system, and the computed power control system of the vehicle takes the control of the powered rear tires trains of the trailer and the steering tires of the pulling vehicle.

The embodiments of this invention are illustrated in FIG. 3 to FIG. 34.

Figure 3:
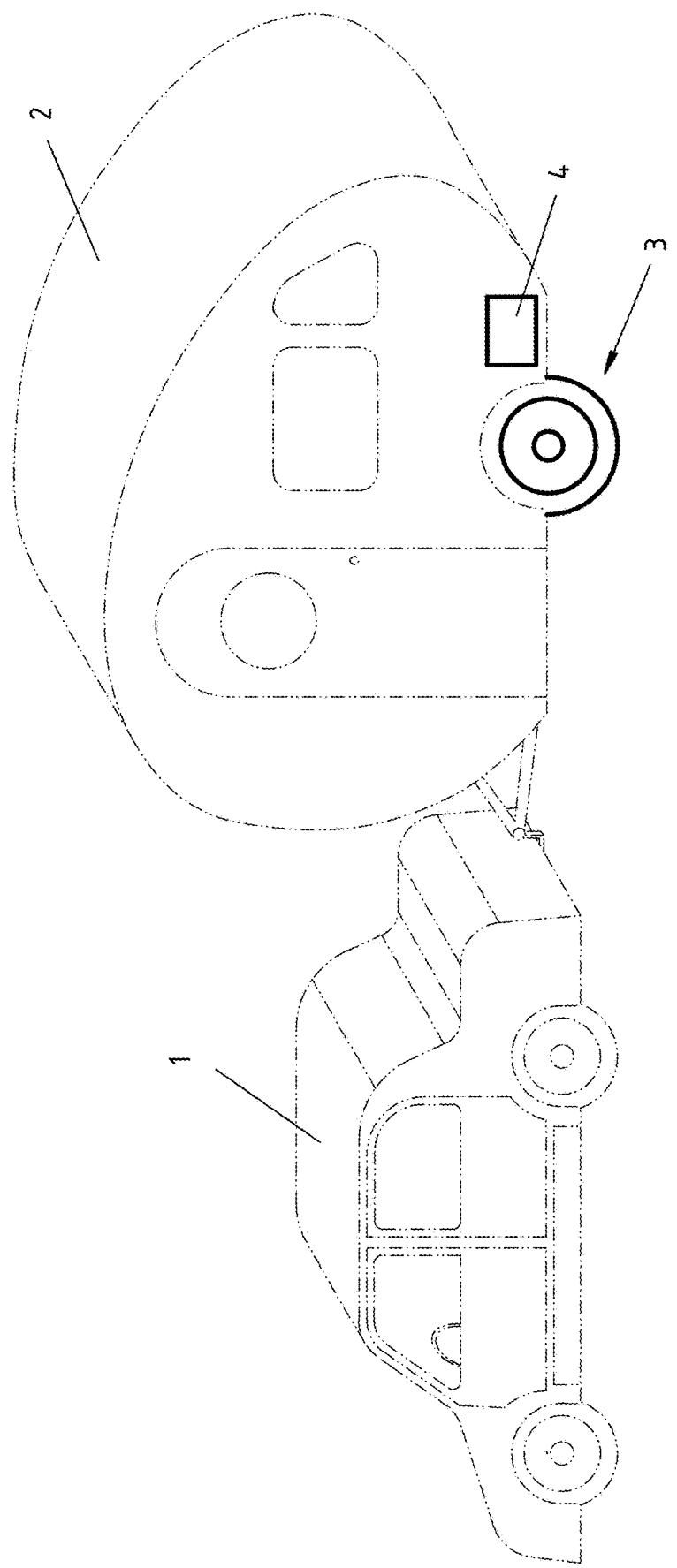
FIG. 3 is an isometric view of a car pooling an electric camping trailer.
Figure 4:
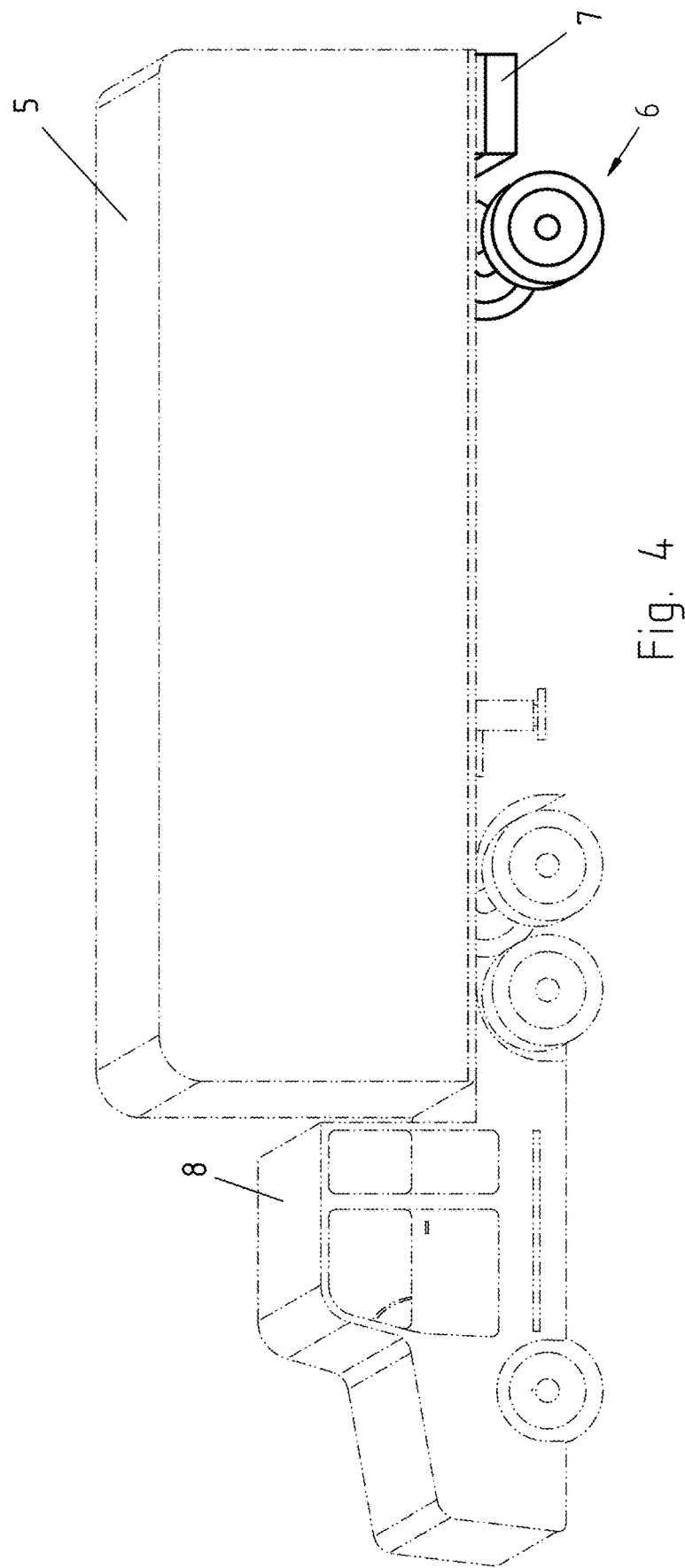
FIG. 4 is an isometric view of a truck pooling an electric trailer with the no-rotating single powered rear tires axis train.
Figure 5:
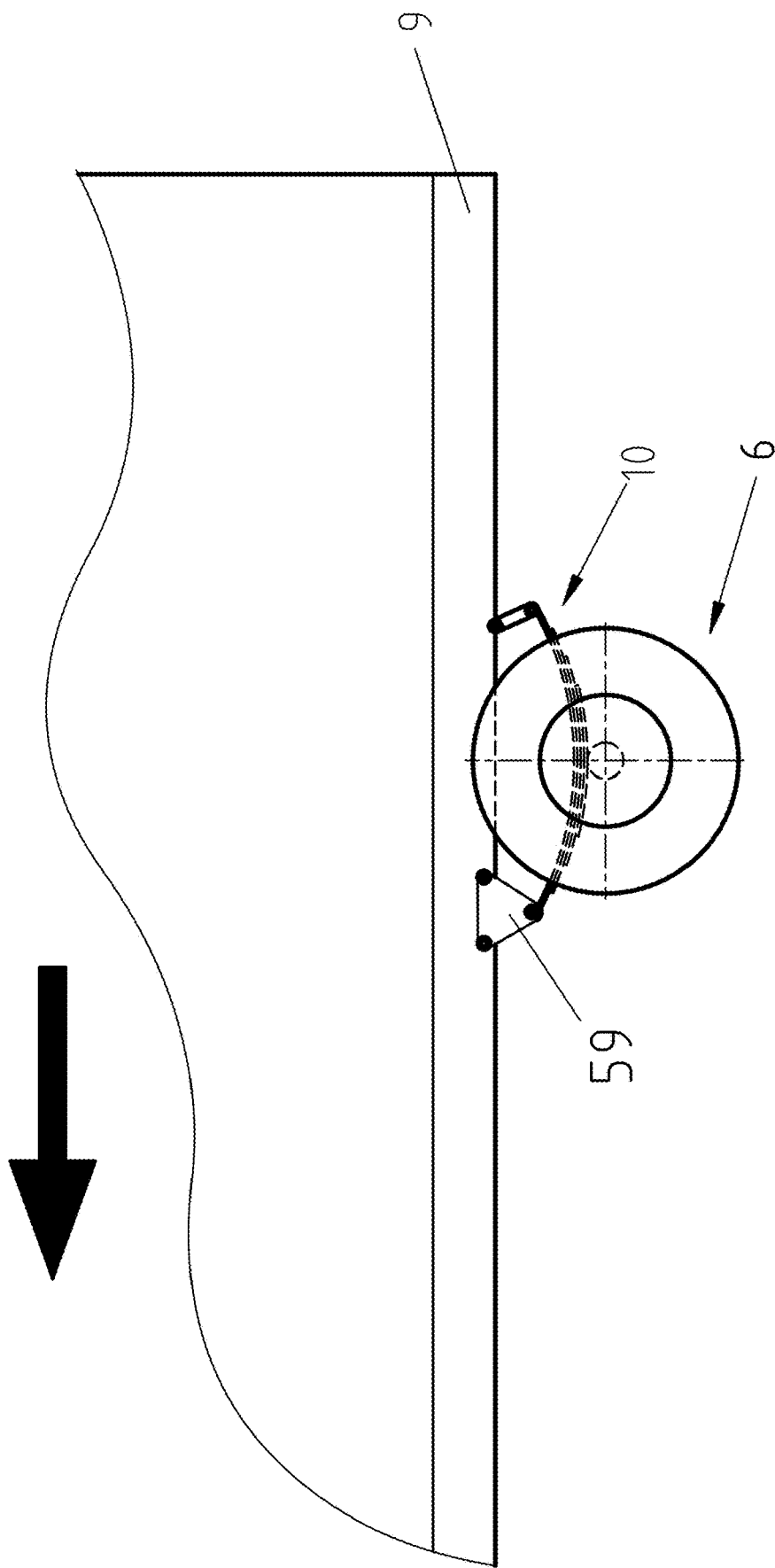
FIG. 5 is a partial lateral view of an electric trailer with the no-rotating single powered rear tires axis train.
Figure 6:
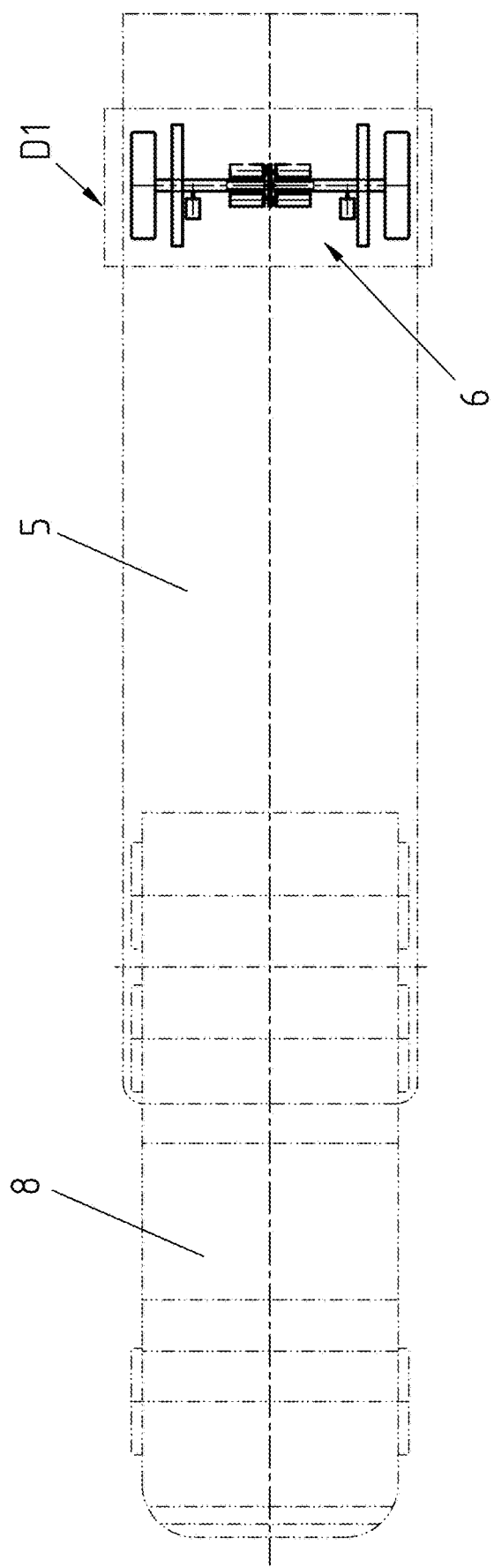
FIG. 6 is a top view of the truck pooling an electric trailer with the no-rotating single powered rear tires axis train.
Figure 7:
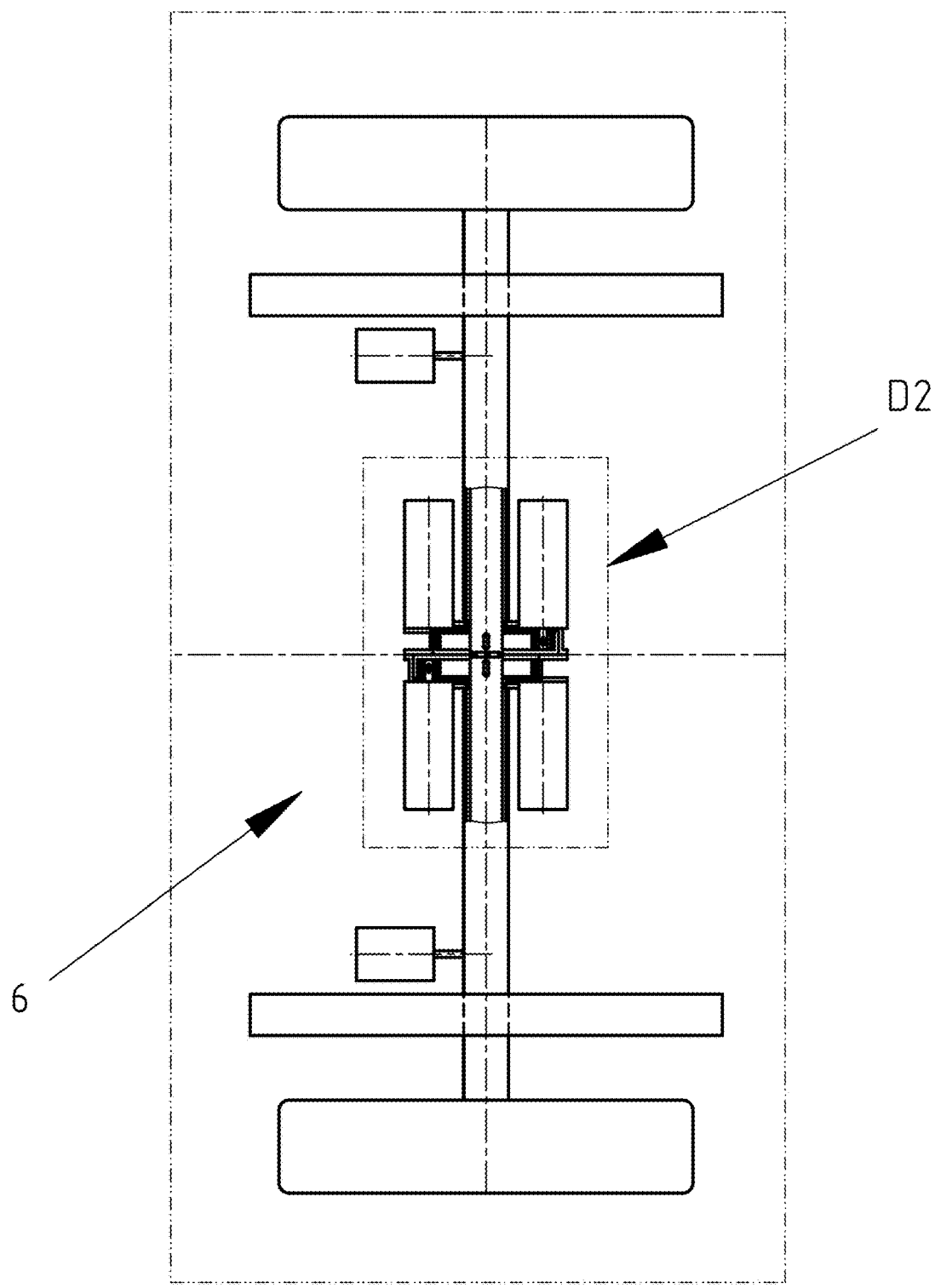
FIG. 7 is the detail D1 of the FIG. 6, showing the no-rotating single powered rear tires axis train of an electric trailer.
Figure 8:
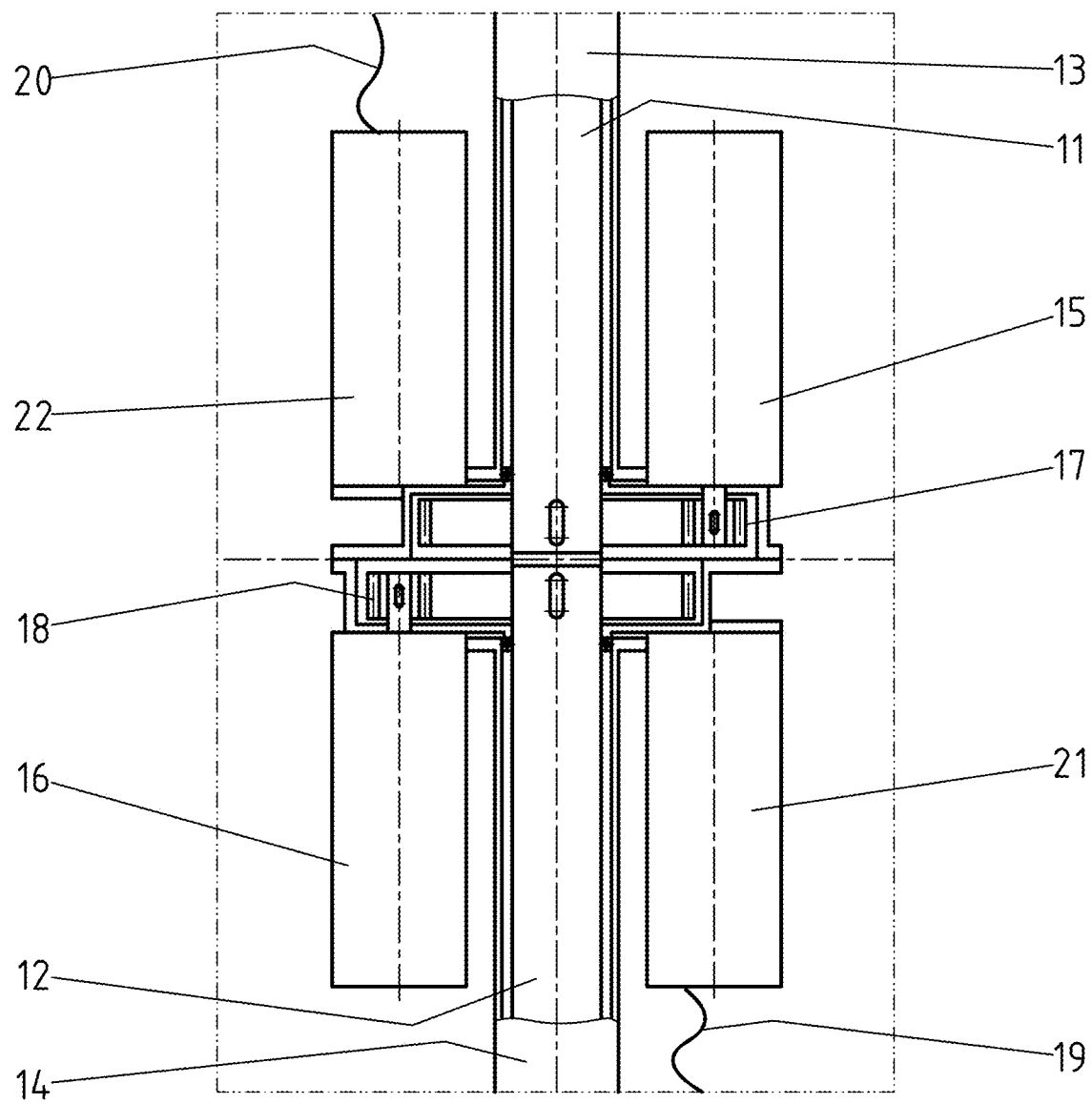
FIG. 8 is the detail D2 of the FIG. 7.

The FIG. 3 to FIG. 13 illustrate small and medium trailers, having a no-rotating powered rear tires train. In FIG. 3 is illustrated a car 1 pooling a camp trailer 2 with a no-rotating single powered rear tires axis train 3 powered by a battery 4. In FIG. 4 is shown a trailer 5 with a no-rotating single powered rear tires axis train 6, powered by a battery 7 pooled by a truck 8. The FIG. 5 is a partial lateral view of the trailer with the no-rotating single powered rear tires axis train 6, showing the rear tires train attached to the trailer frame 9 via the suspension system 10 solidly attached to the stationary components 69 of the single rear tires train axis. The FIG. 6 is a top view of a truck 8 with its trailer 5 with the no-rotating single powered rear tires axis train 6, shown in Detail D1. The FIG. 7 is the detail D1 of the FIG. 6, showing the no-rotating single powered rear tires axis train 6. In FIG. 8 is illustrated the detail D2 of the FIG. 7 showing the two independent rotating tires axis 11 and 12, which turn inside of the stationary components of the single powered rear tires axis train 13 and 14 on a pair of Bearings, each one. Each of the rotating axis are powered by an electric motor 15 and 16, via a pair of gears 17 and 18. Both electric motors are connected by the cables 19 and 20 to the computed power control system of the vehicle and to the trailer battery via two inverters 21 and 22.

Figure 9:
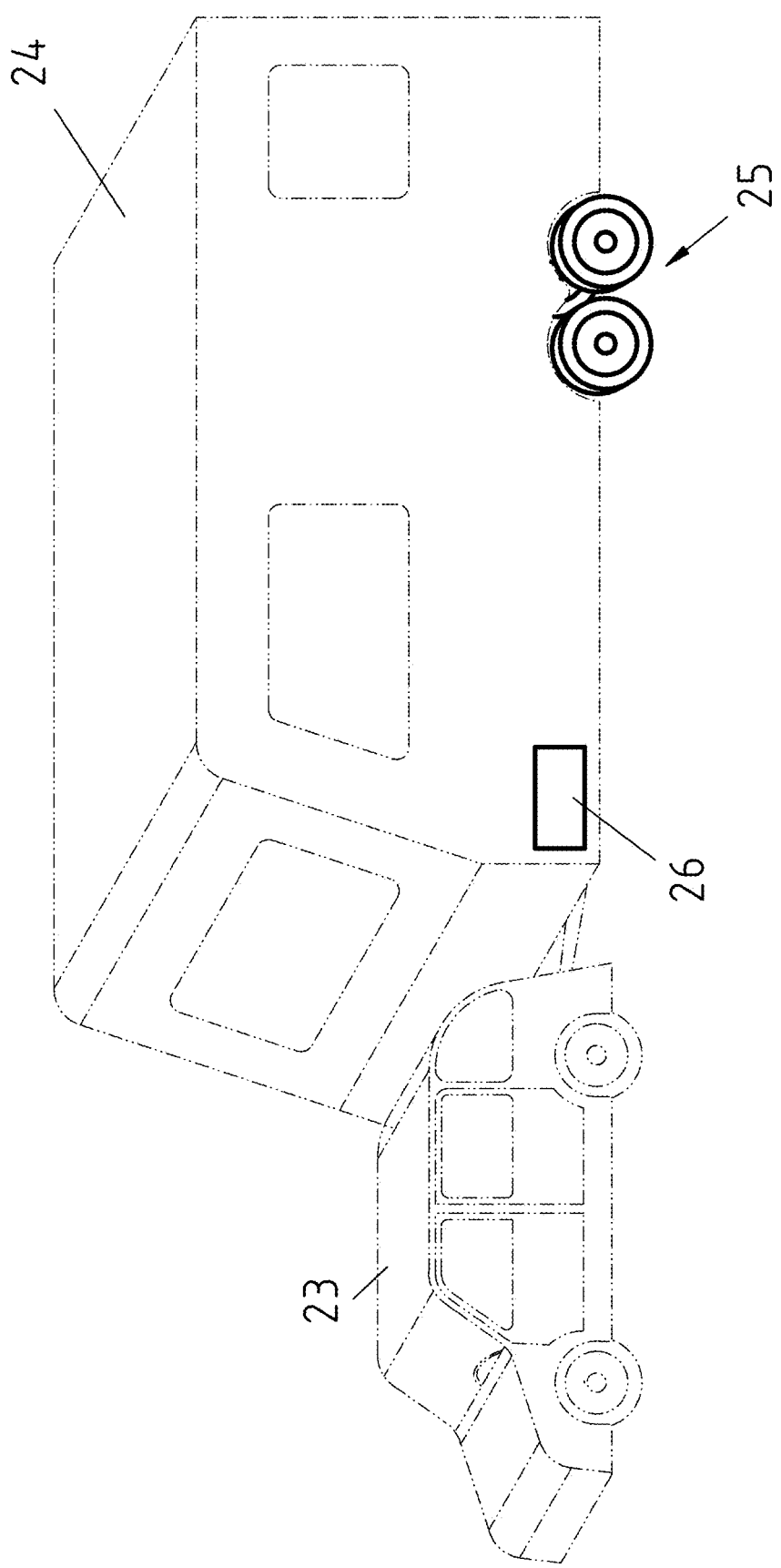
FIG. 9 is a SUV, pooling a camp trailer with a no-rotating tandem powered rear tires train.
Figure 10:
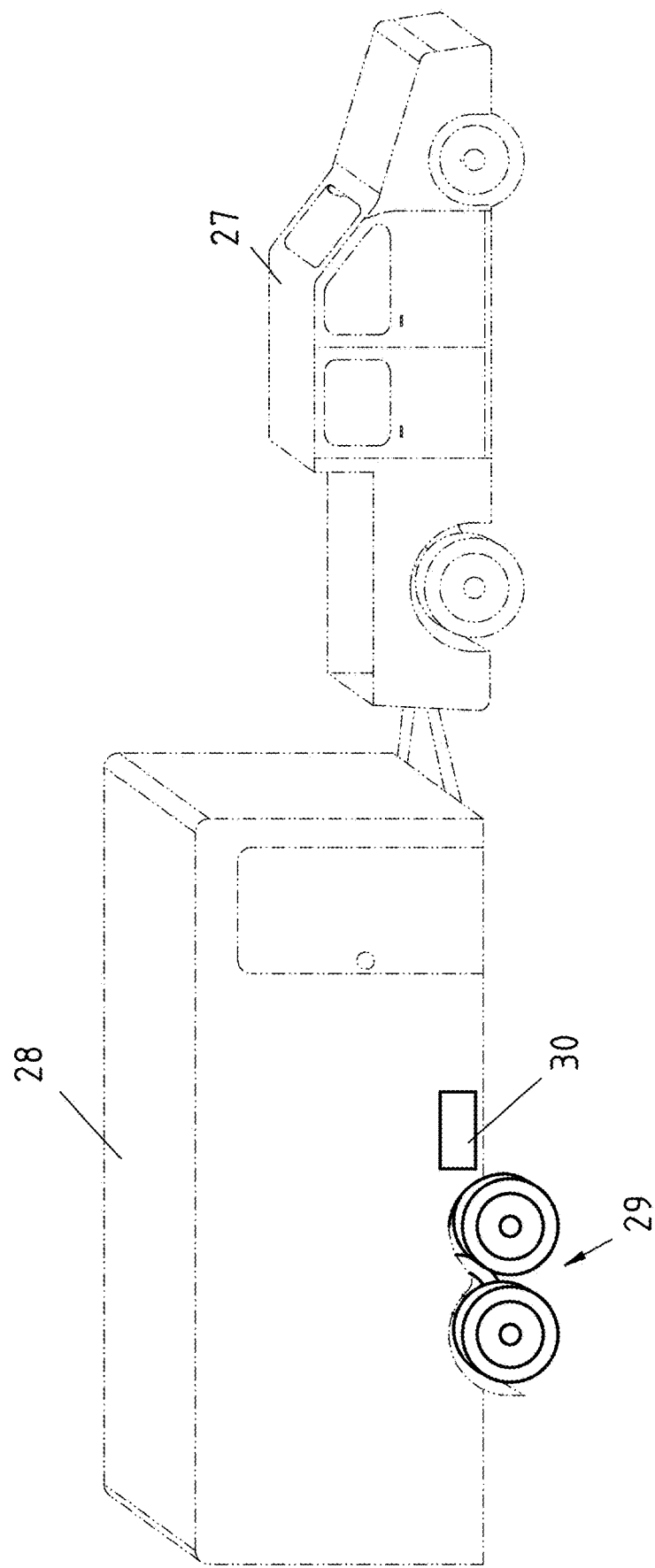
FIG. 10 is a light truck pooling a horses trailer with a no-rotating tandem powered rear tires train.

In FIG. 9 and FIG. 10 are illustrated trailers with a no-rotating tandem rear tires train. In FIG. 9 is a SUV 23, pooling a camp trailer 24 with a no-rotating tandem powered rear tires train 25, powered by the battery 26. In FIG. 10 is a light truck 27 pooling a horses trailer 28 with a no-rotating tandem powered rear tires train 29, powered by the battery 30.

Figure 11:
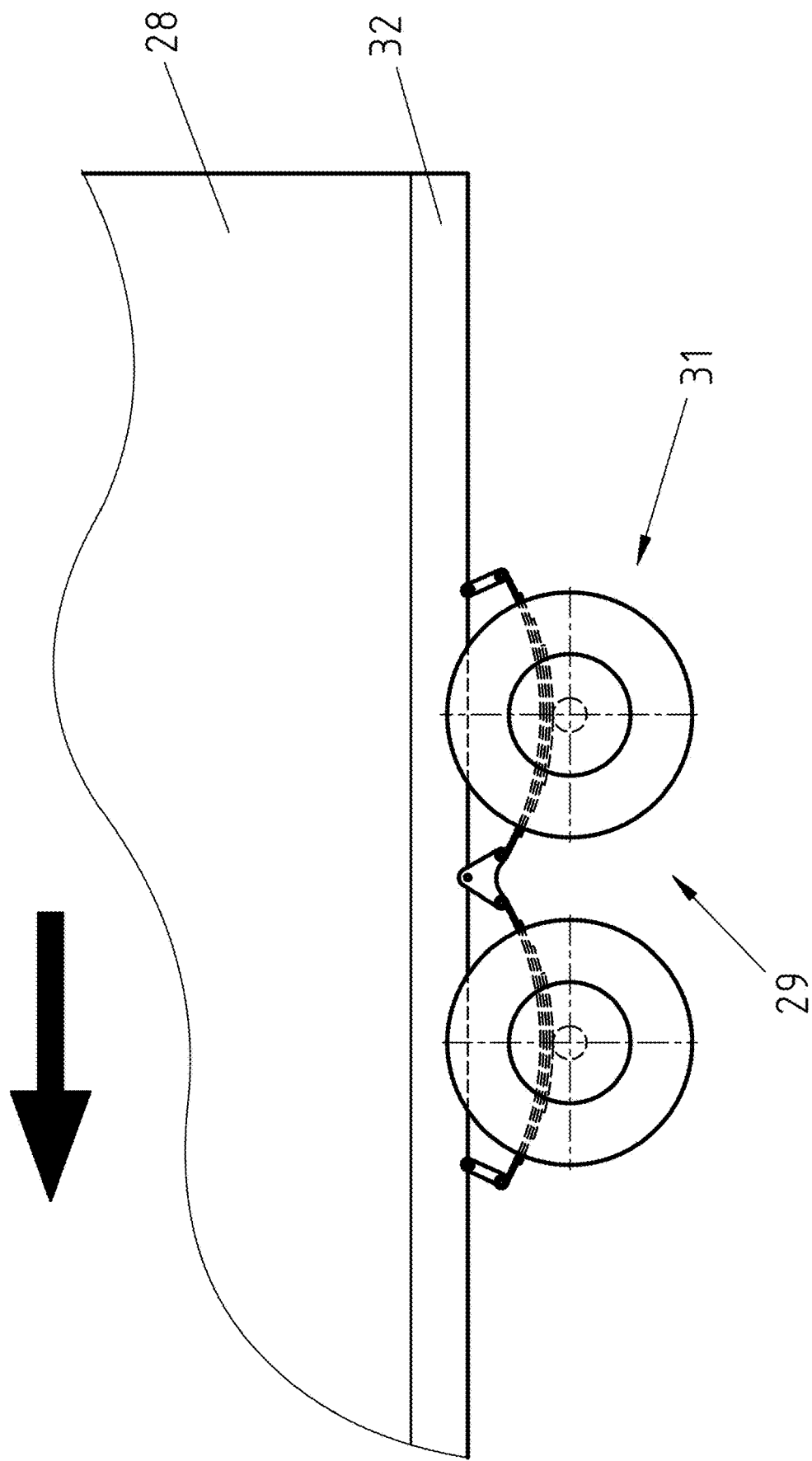
FIG. 11 is a partial lateral view of a no-rotating tandem powered rear tires train.

The FIG. 11 is a partial lateral view of a horse trailer 28 with a no-rotating tandem powered rear tires train 29, showing the powered rear tires train 31 attached to the trailer frame 32 via the suspension system solidly attached to the stationary components of the tandem powered rear tires train axis.

Figure 12:
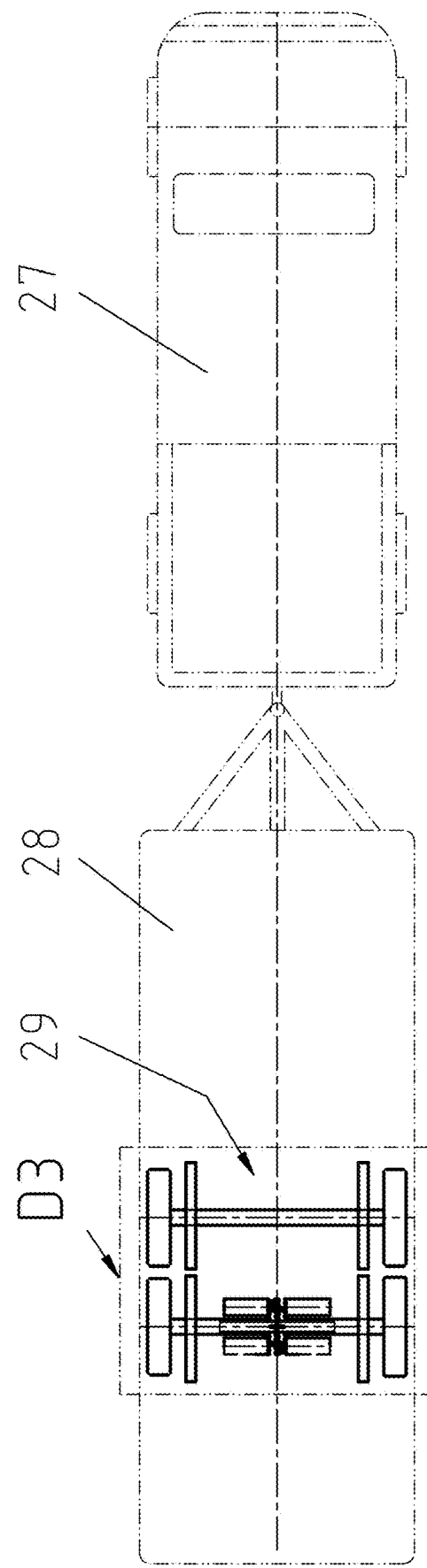
FIG. 12 is a top view of the pick-up truck pooling a horse trailer with the no-rotating tandem powered rear tires train.
Figure 13:
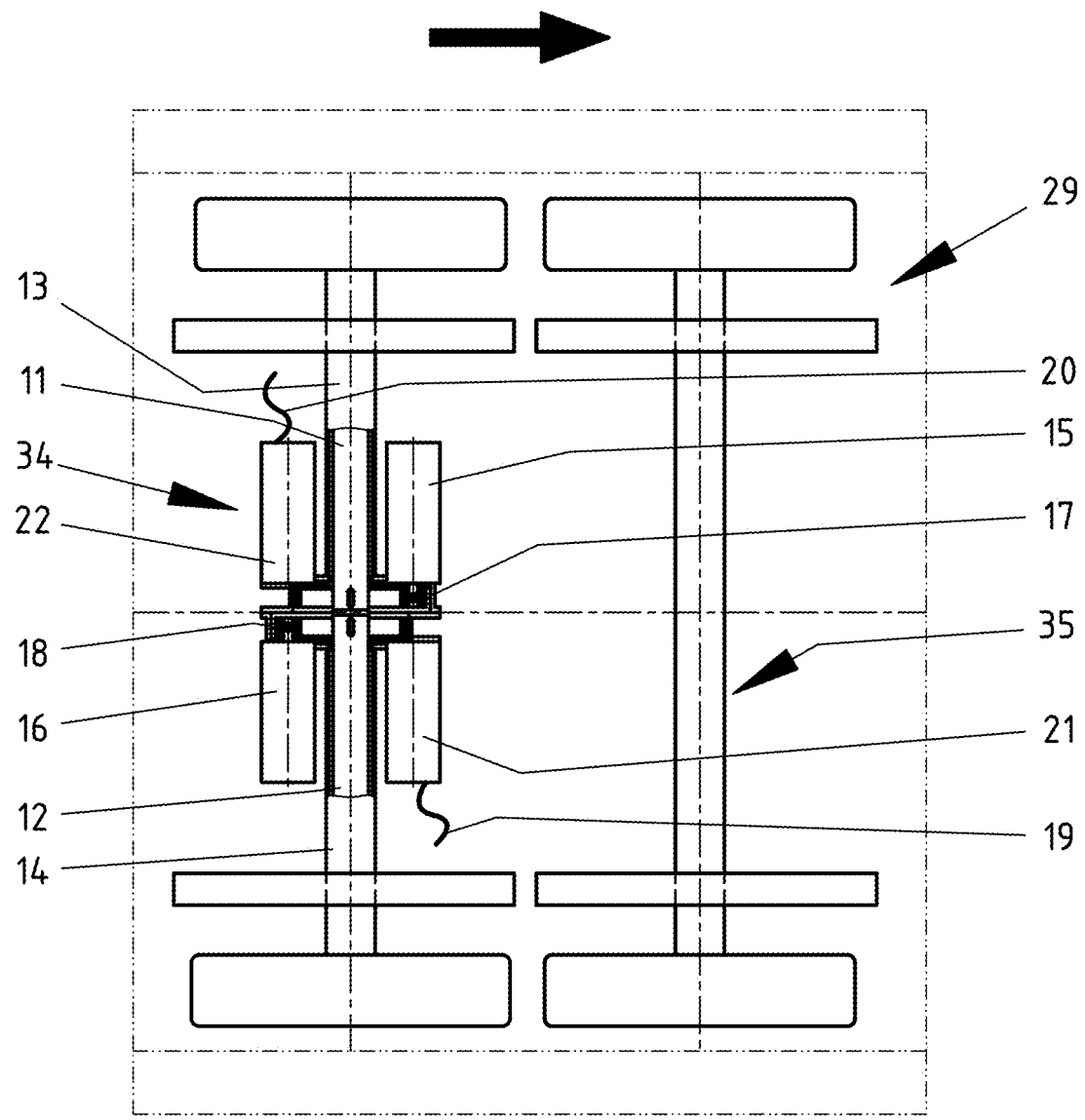
FIG. 13 is a the detail D3 of the FIG. 12, illustrating the no-rotating tandem powered rear tires train with the two rear tires axis assemblies.

The FIG. 12 is a top view of the pick-up truck 27 pooling a horse trailer 28 with the no-rotating tandem powered rear tires train 29. The detail D3 of the FIG. 12, is shown in FIG. 13, illustrating the no-rotating tandem powered rear tires train 29 with the two rear tires electric powered axles. The electric powered axle 34 is, as always, in the rear position. In front of the tandem is an ordinary axis assembly 35. The electric powered axle is the same as one of a no-rotating single rear tires train of the FIG. 7, comprising the two independent rotating tires axis 11 and 12, which turn inside of the stationary components of the single powered rear tires axis train 13 and 14, each one being supported by two rotary bearings (see Detail D2 in FIG. 8). Each of the rotating axis are powered by an electric motor 15 and 16, via a pair of gears 17 and 18. Both electric motors are connected by the cables 19 and 20 to the computed power control system of the vehicle and to the trailer battery via two inverters 21 and 22.

Figure 14:
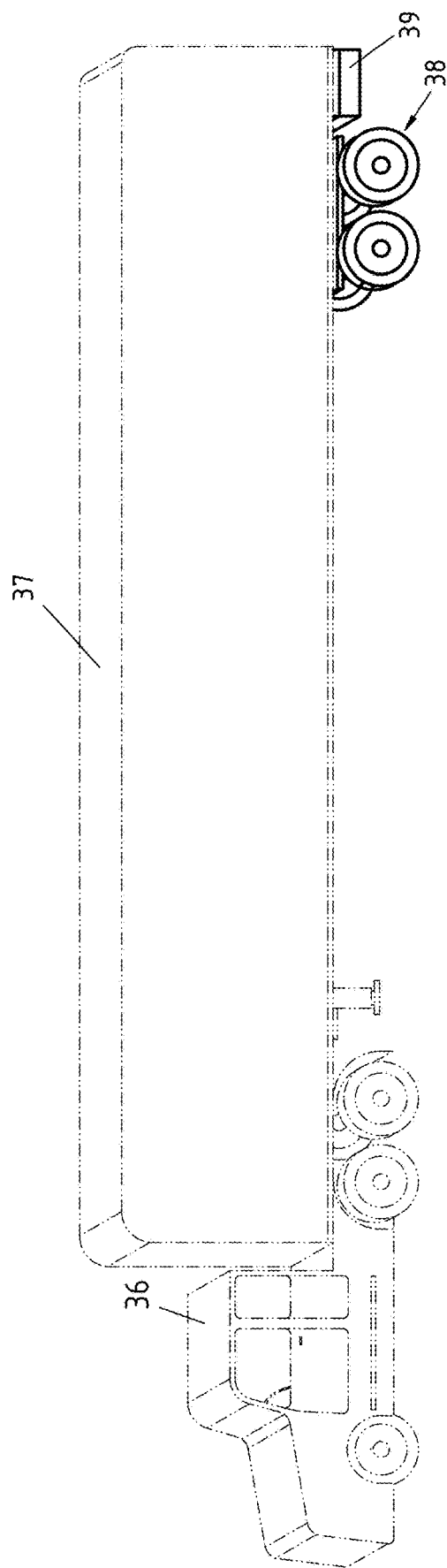
FIG. 14 is an isometric view of a truck pooling a very long trailer having a tandem pivoting powered rear tires train.
Figure 15:
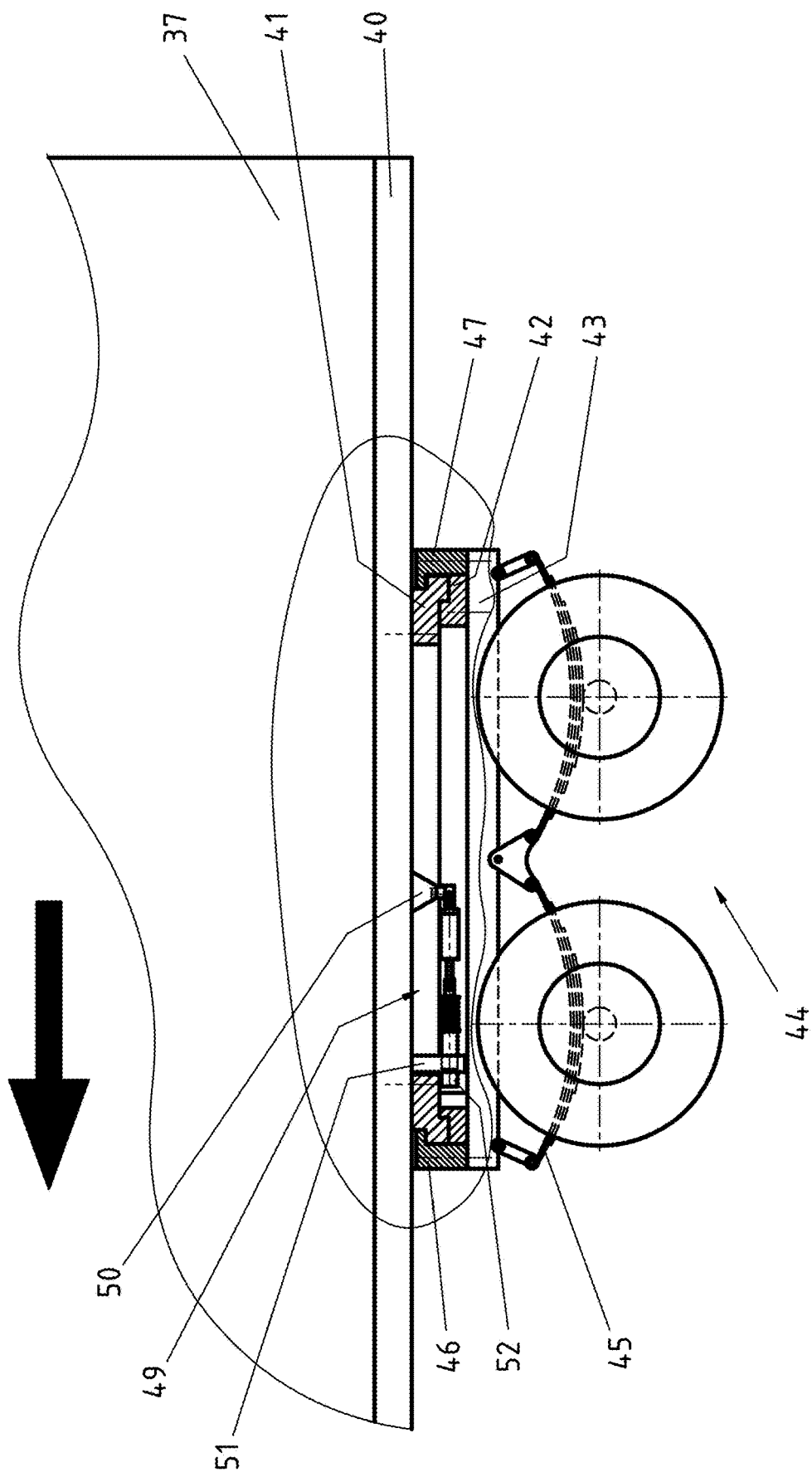
FIG. 15 is a partial view with a partial section of the rear side of an electric trailer with the tandem pivoting powered rear tires train and with its pivoting, locking and unlocking mechanism.
Figure 16:
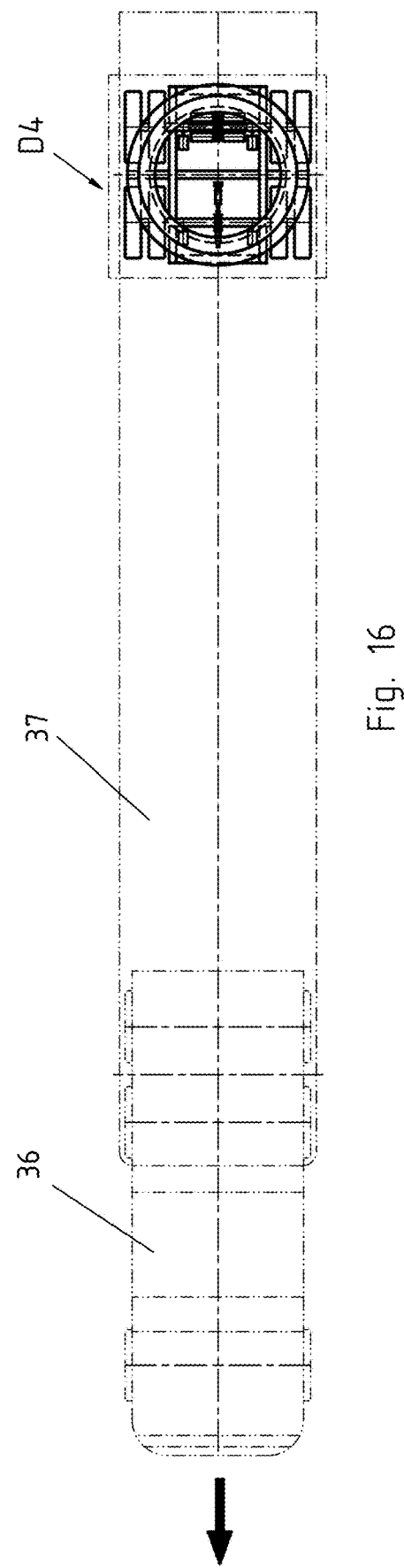
FIG. 16 is a top view of the truck and the electric trailer presented in FIG. 14.
Figure 17:
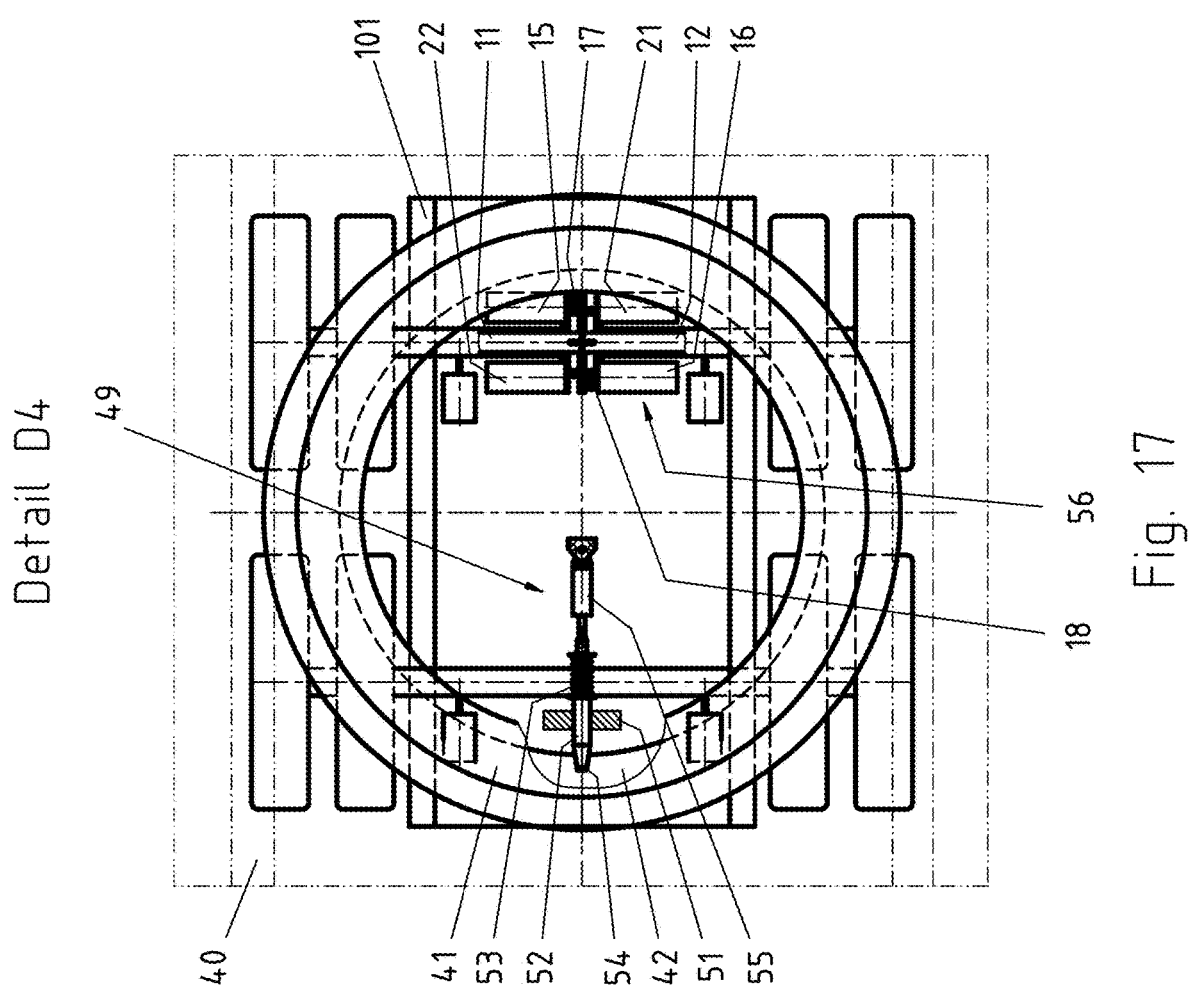
FIG. 17 is the detail D4 of the FIG. 16.

In FIG. 14 is illustrated a truck 36 pooling a very long trailer 37 having a tandem pivoting powered rear tires train 38 powered by the battery 39. In a partial lateral view, in FIG. 15 is shown partially the rear side of the trailer 37 and the tandem pivoting powered rear tires train with its pivoting mechanism and locking and unlocking mechanism. On the trailer frame 40 (which is part of the structure of the trailer) is attached rigidly the supporting ring 41, sliding concentrically on the pivoting ring 42 solidly attached to the tandem pivoting frame 43 of the tandem rear tires train. The pivoting ring 42 and the tandem pivoting frame 43 are attached to the rear tires electric powered axles 44 via the suspension system 45. The two rings 41 and 42 are in contact due to the gravity force, but they are secured by the two semi-rings 46 and 47 attached rigidly on the tandem pivoting frame 43, turning around of the supporting ring 41 and not moving relative to the pivoting ring 42. The locking and unlocking mechanism 49 is attached to the trailer frame 40 by the rigid support 50 and by the sliding support 51. Inside of the sliding support 51 is sliding a locking pin 52. The FIG. 16 is a top view of the truck 36 and the trailer 37 presented in FIG. 14. As it is shown, in FIG. 15 and FIG. 17, which is the detail D4 of the FIG. 16, the trailer frame 40 with the supporting ring 41 solidly attached to it supports the pivoting ring 42, which is sliding concentrically on the supporting ring 41. The locking and unlocking mechanism 49 comprises a locking pin 52, which slides into a sliding support 51 solidly attached to the trailer frame 40. The locking pin 52 is activated by a compression spring 53, which pushes the locking pin 52 into a locking slot 54 made on the pivoting ring 42, locking the tandem rear tires train in a forward drive position (the rear tires axis are normal to the trailer axis and to the driving direction). In order to allow a free rotation of the tandem powered rear tires train relative to the trailer, the locking pin 52, sliding into the sliding support 51, is pooled out from the locking slot 54 by the actuator 55, which may be a pneumatic cylinder. After the turning maneuverings are completed and the truck and trailer continue on a relatively straight direction, the actuator 55 ceases to act, the locking pin 52 is in front of the locking slot 54 and it will go into the locking slot 54, locking the tandem powered rear tires train and avoiding any rotation of the tandem powered rear tires train with respect to the trailer. As for the no-rotating tandem powered rear tires trains, the electric powered axles 56 is always in the rear position of the tandem. It comprises the two independent electric motors 15 and 16, activating the two rotating axis 11 and 12 via the gears 17 and 18, being controlled by the computed power control system of the vehicle via two inverters 21 and 22.

Figure 18:
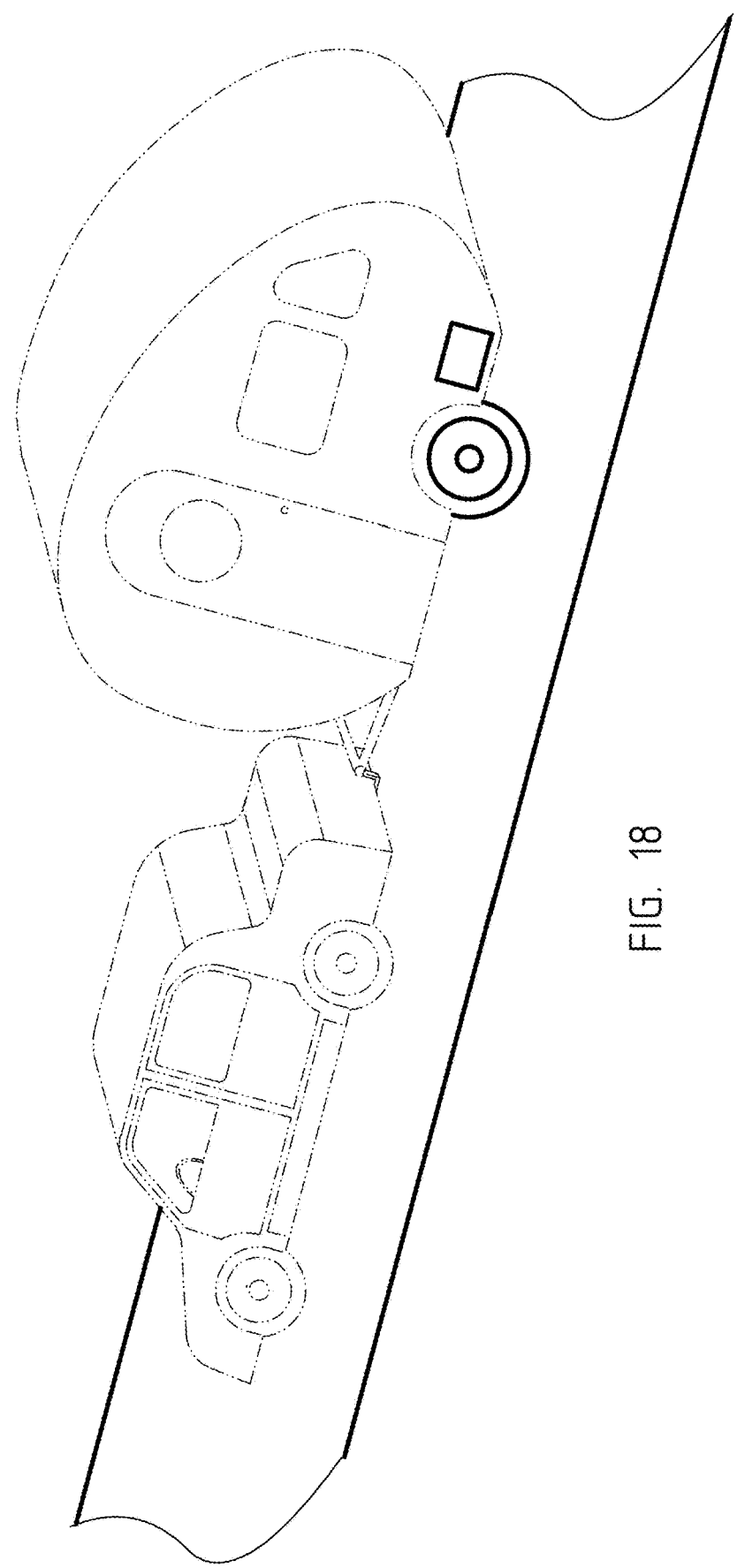
FIG. 18 is a car pooling a camping trailers, climbing a slope.
Figure 19:
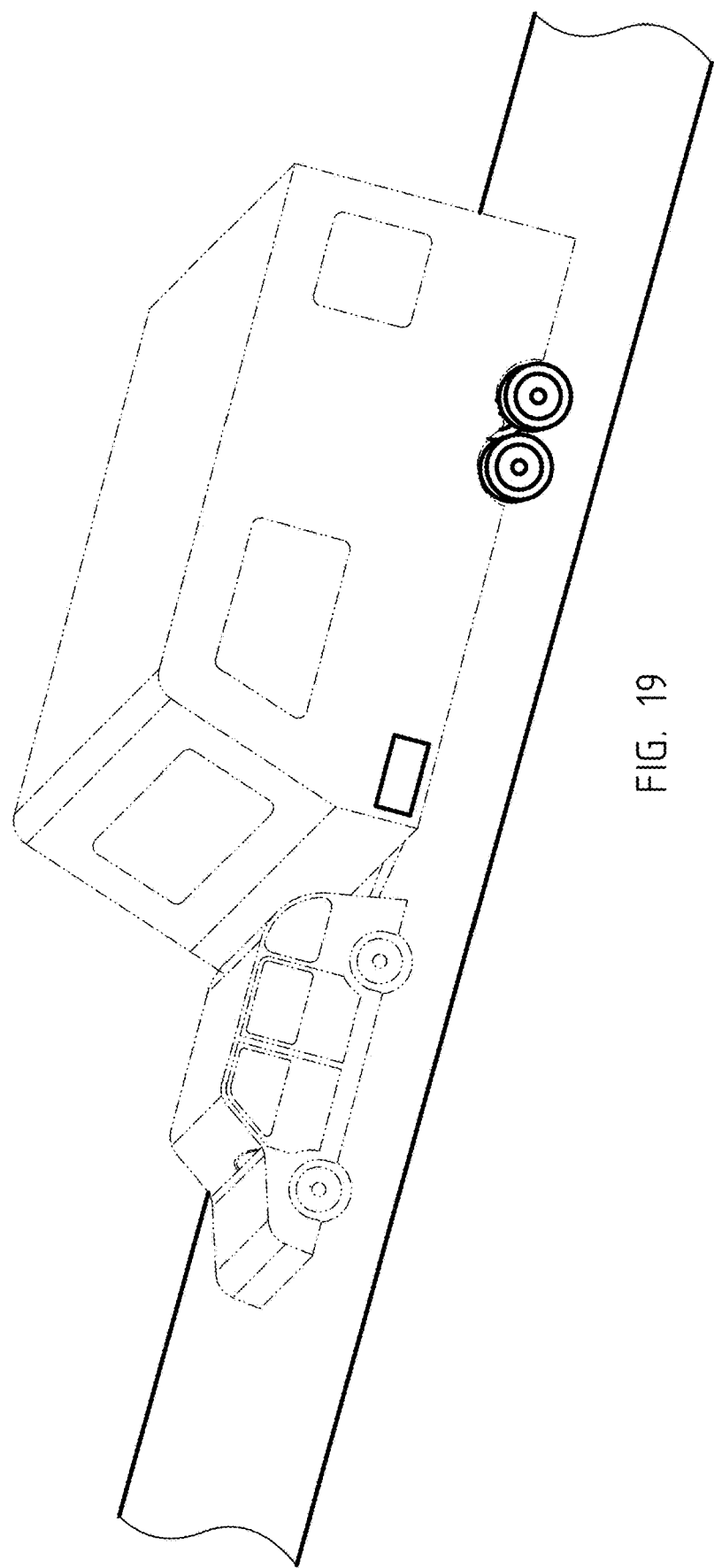
FIG. 19 is a SUV pooling a camping trailers, climbing a slope.
Figure 20:
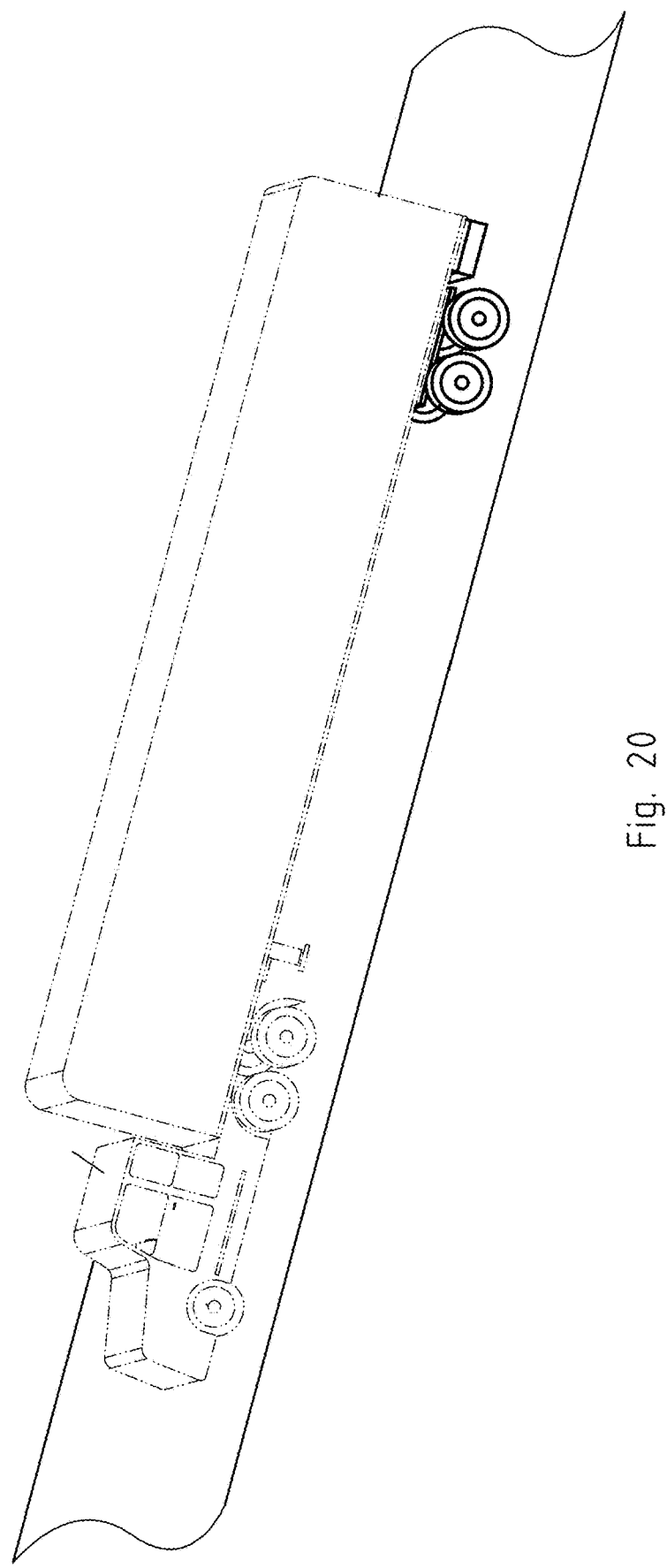
FIG. 20 is a truck pooling a long electric trailers, climbing a slope.

In FIG. 18, FIG. 19 and FIG. 20 are illustrated different types of vehicles pooling different type of trailers, climbing a slope. Using the electric motors of each trailer, the vehicles can keep a decent speed even if the trailer is big and heavy in comparison with the vehicle. When climbing on serpentine any kind of electric trailer may provide extra power by pushing from the rear of the vehicle. In curves the computed power control system of the vehicle adjusts the speed of each side tire, based on the torque value, thus each tire pushes in equal meaner.

Figure 2:
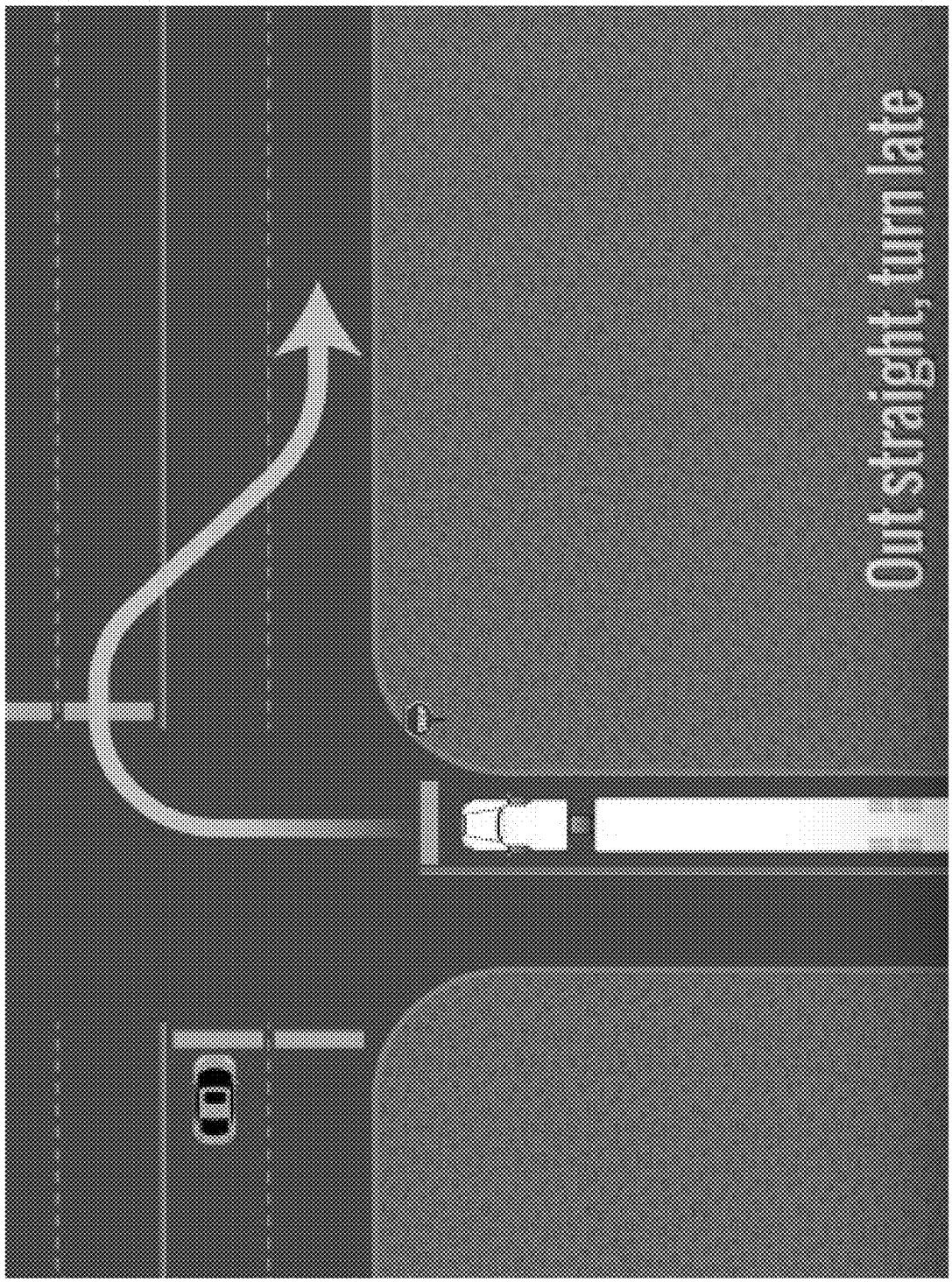
FIG. 2. is a picture of the actual trailers into an intersection, showing the trajectory of the truck and the trailer tires for a very long trailer requiring a jug handle turn.
Figure 21:
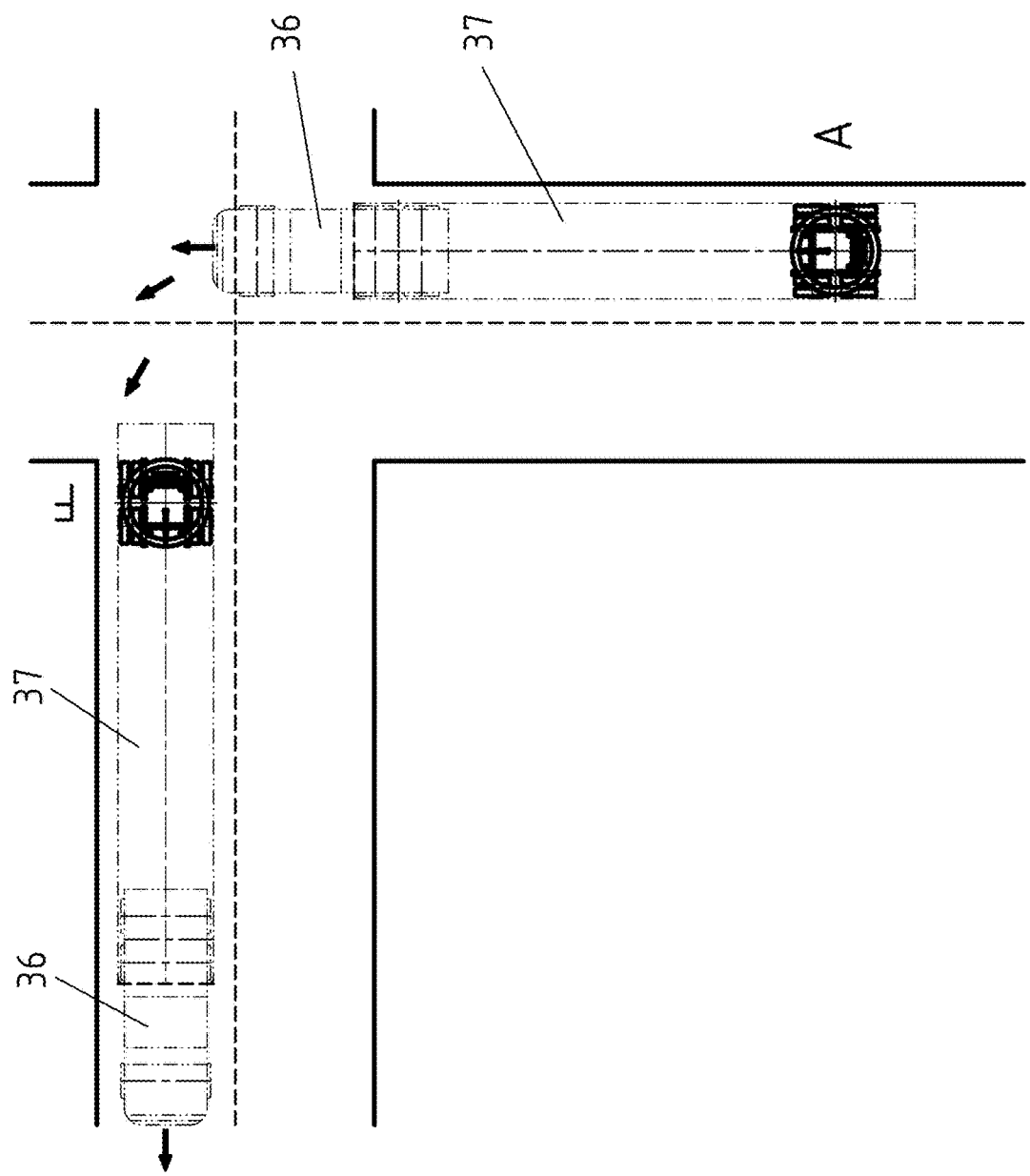
FIG. 21 is a tight intersection where a truck with a very long electric trailer is shown in the initial and final position.
Figure 22:
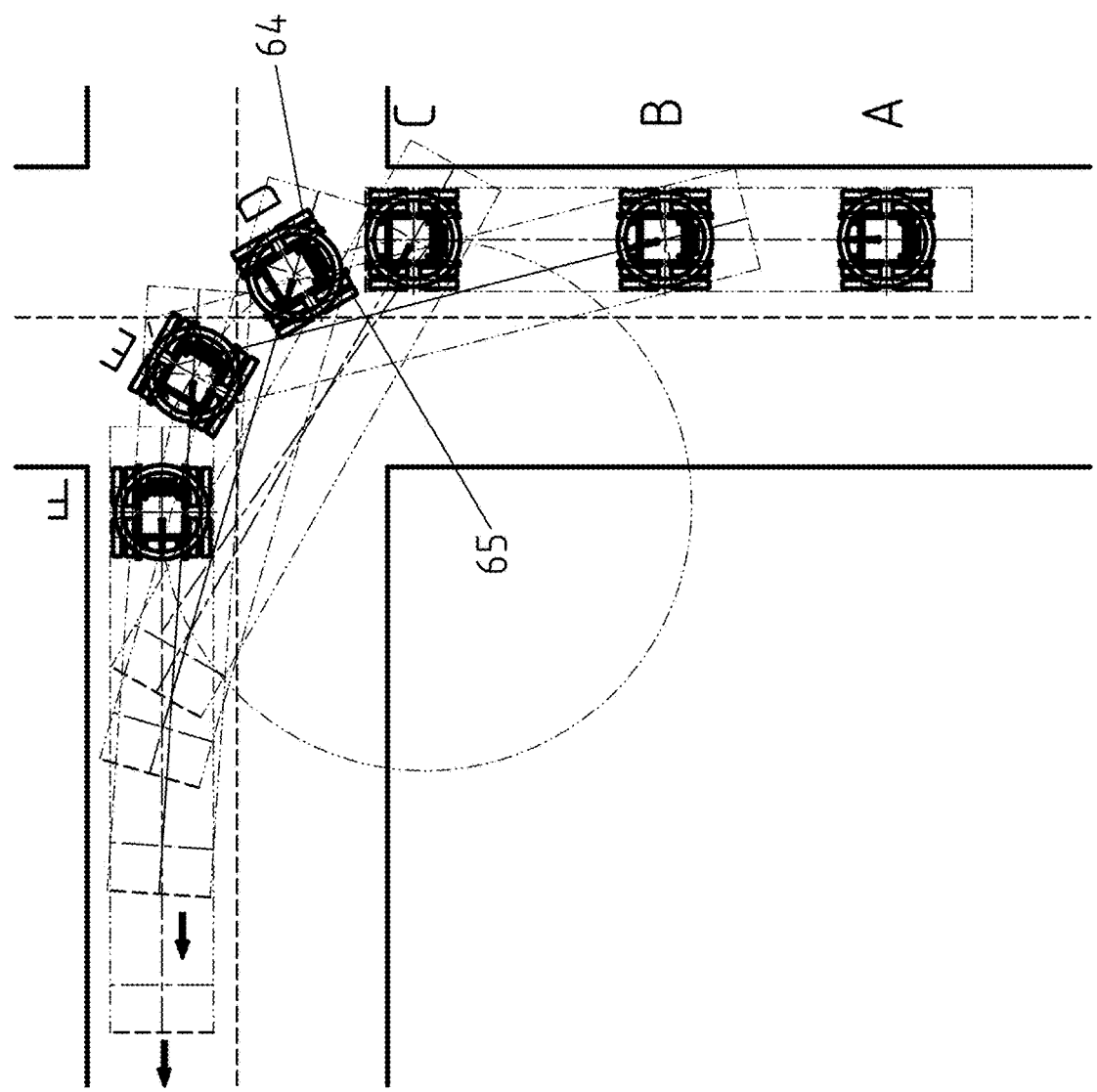
FIG. 22 is a top view of an electric trailer where are illustrated the successive positions A, B, C, D, E and F of it and its pivoting rear tires train during the turn into an intersection.
Figure 23:
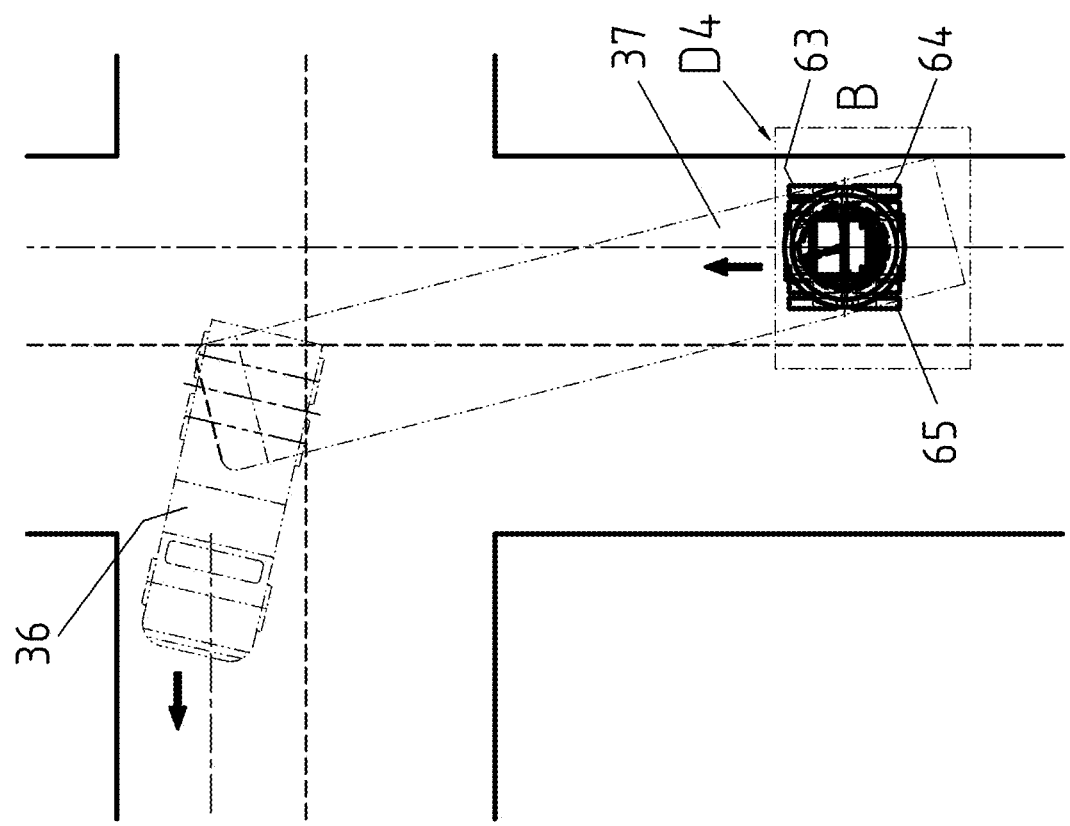
FIG. 23 is a top view of a truck pooling an electric trailer, shown in a position where the truck and the electric trailer turn, in time that its pivoting rear tires train keeps going straight parallel to the road axis.
Figure 24:
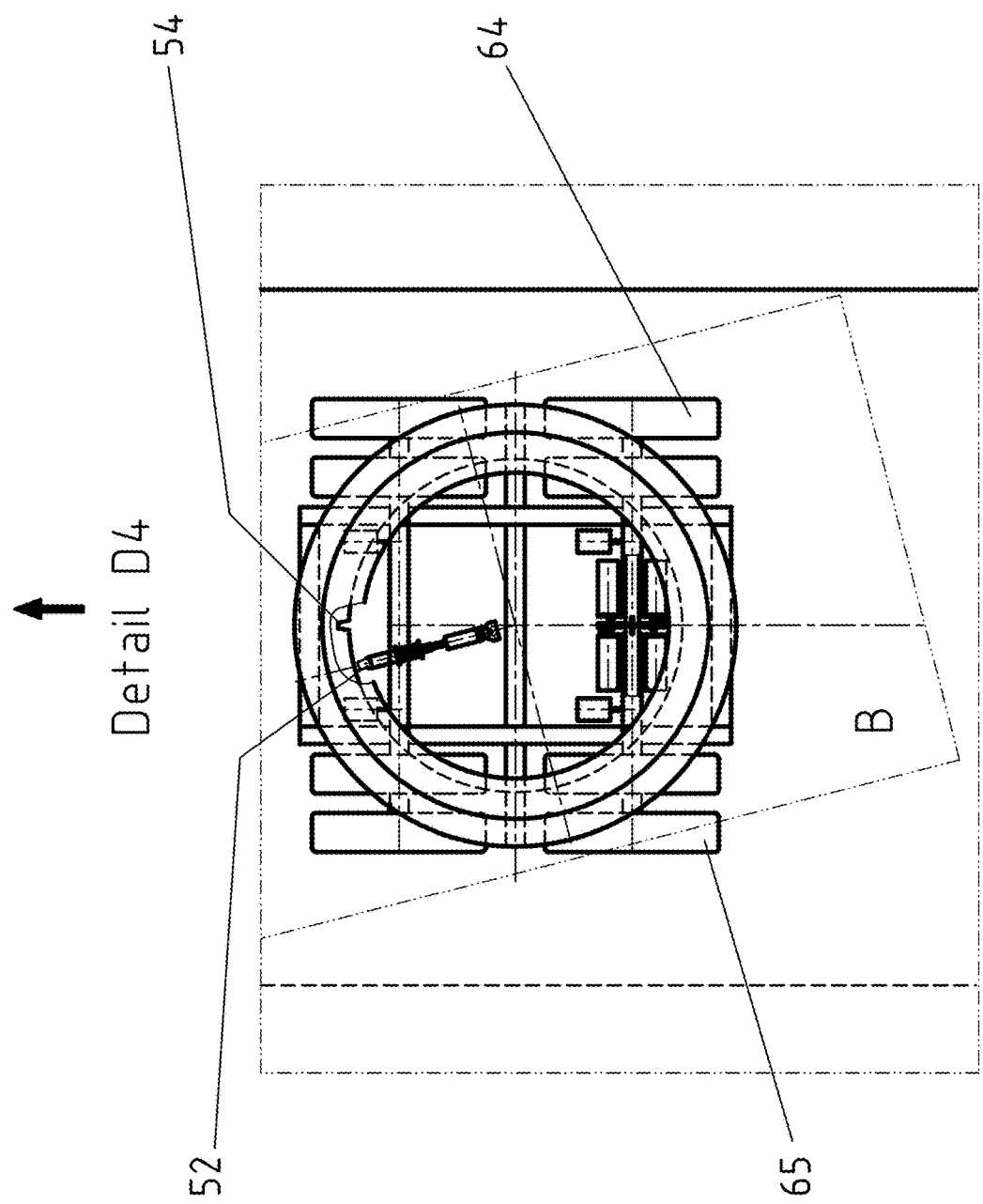
FIG. 24 is the detail D4 of FIG. 23.
Figure 25:
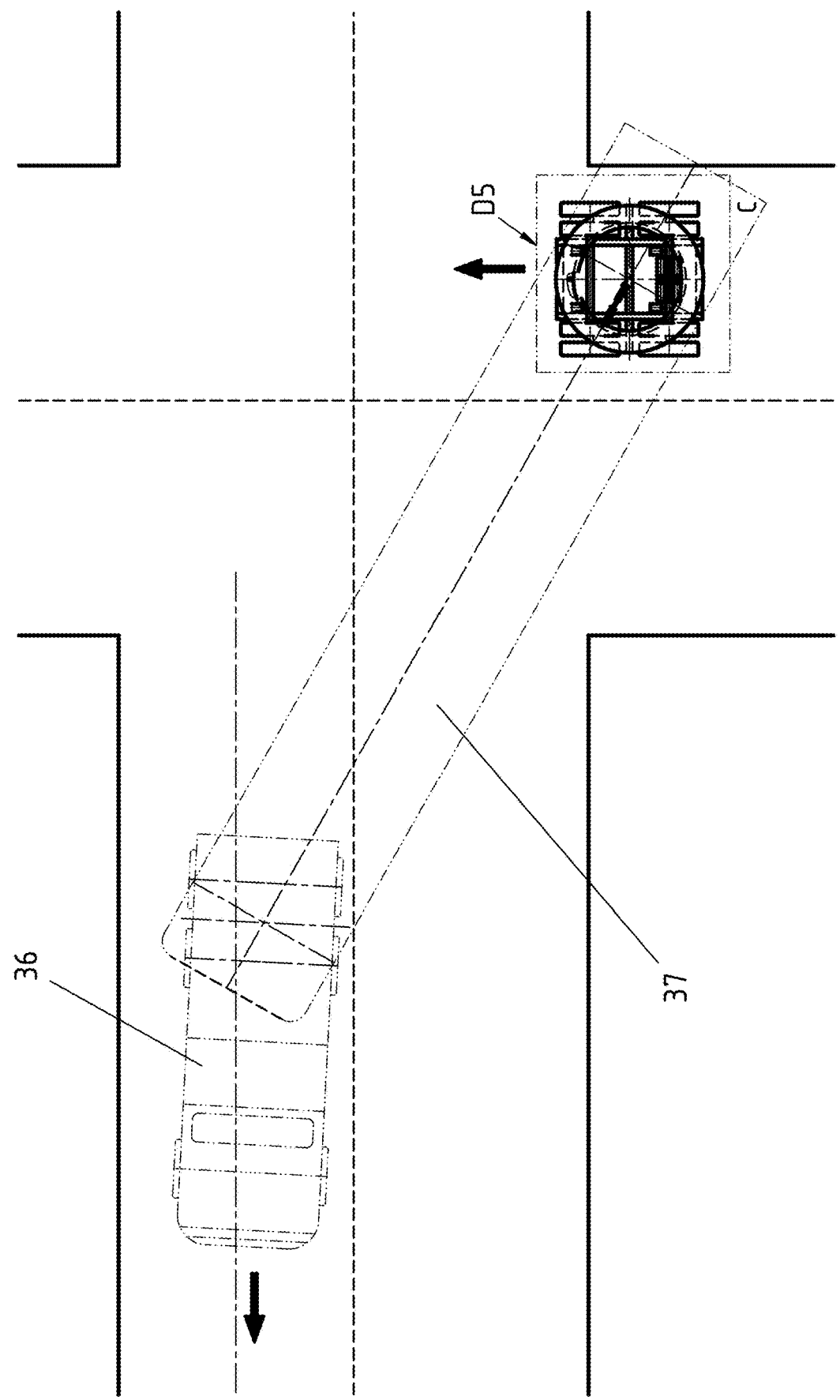
FIG. 25 is a top view of the truck and the electric trailer shown in the C position.
Figure 26:
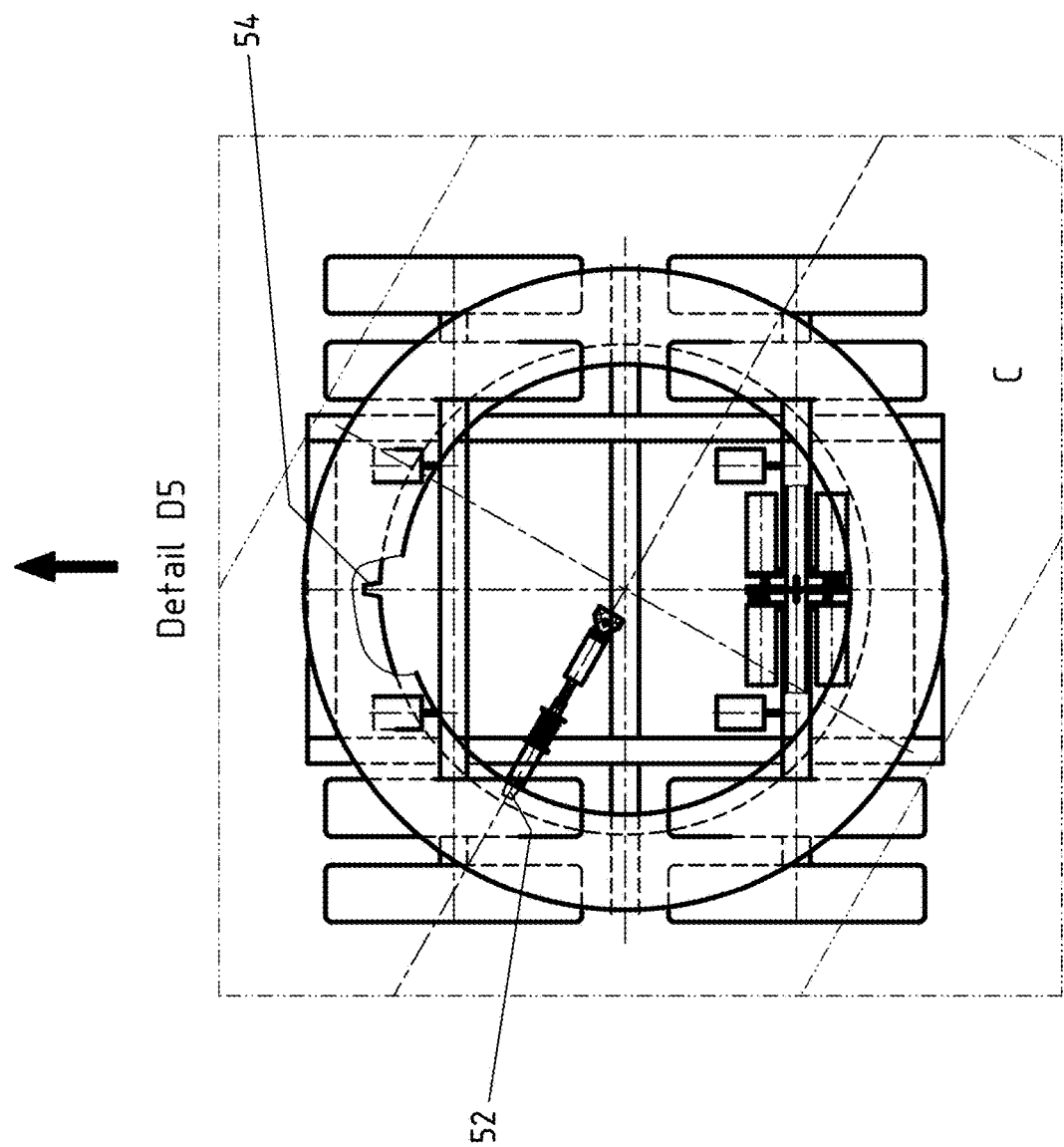
FIG. 26 is the detail D5 of the FIG. 25, illustrating the pivoting rear tires train in C position.

For very long trailers the turns are difficult and complicated, as shown in FIG. 1 and FIG. 2. Using the electric trailers with pivoting rear tires train the maneuverings are much easier and the off-braking may be avoid. In FIG. 21 is shown a tight intersection for a very long trailer, where the actual version of trailers is impossible to turn without any off-braking or in a single maneuverings. The trailer 37 has to move from position A to position F, pooled by the truck 36. By using the pivoting rear tires train it is possible to turn in this tight intersection in a single maneuverings without any collision or off-braking, as is shown in FIG. 22 where are illustrated the successive positions A, B, C, D, E and F of the trailer and its pivoting rear tires train during the turn. As can be seen the truck starts turning immediately when it is into the intersection, but the rear tires train is keeping going strait, approaching to the intersection, in position B and C, and starting to turn only when it is into the intersection between the position C and F, see position D and E. As can be seen in FIG. 23 in position B the trailer 37 pooled by the truck 36 starts turning and its axis has a certain angle with respect to the road axis in time that the pivoting rear tires train 63 keep going straight parallel to the road axis. This maneuverings is possible because the way the computed power control system of the vehicle commands the locking sliding pin 52 to go out of the locking slot 54 (see FIG. 24) setting free for rotation the pivoting rear tires train of the trailer. The computed power control system of the vehicle turns ON the two electric motors of the electric trailer, keeping the same speed for both side tires 64 and 65 on the entire portion of the road up to the intersection, from position A to position C. Into the intersection, (see FIG. 22) the computed power control system of the vehicle adjusts the speed of each side powered tire such as the external tire of the train 64 run faster than the internal tire of the train 65, and in this way the rear tires train of the trailer moves on a circular trajectory between the position C to position F, in time that the truck 36 continue to run straight on the new direction. The FIG. 24, which is the detail D4 of FIG. 23, shows the pivoting rear tires train of the vehicle having the sliding locking pin 52 out of the locking slot 54, rotated with respect to the trailer axis, running parallel to the road axis, due to the equal speed of the two tires 64 and 65. In FIG. 25 is shown the truck 36 and the trailer 37 in the C position. The detail D5 of the FIG. 25 is shown in FIG. 26, illustrating the pivoting rear tires train in C position, with the pin 52 out of the slot 54.

Figure 27:
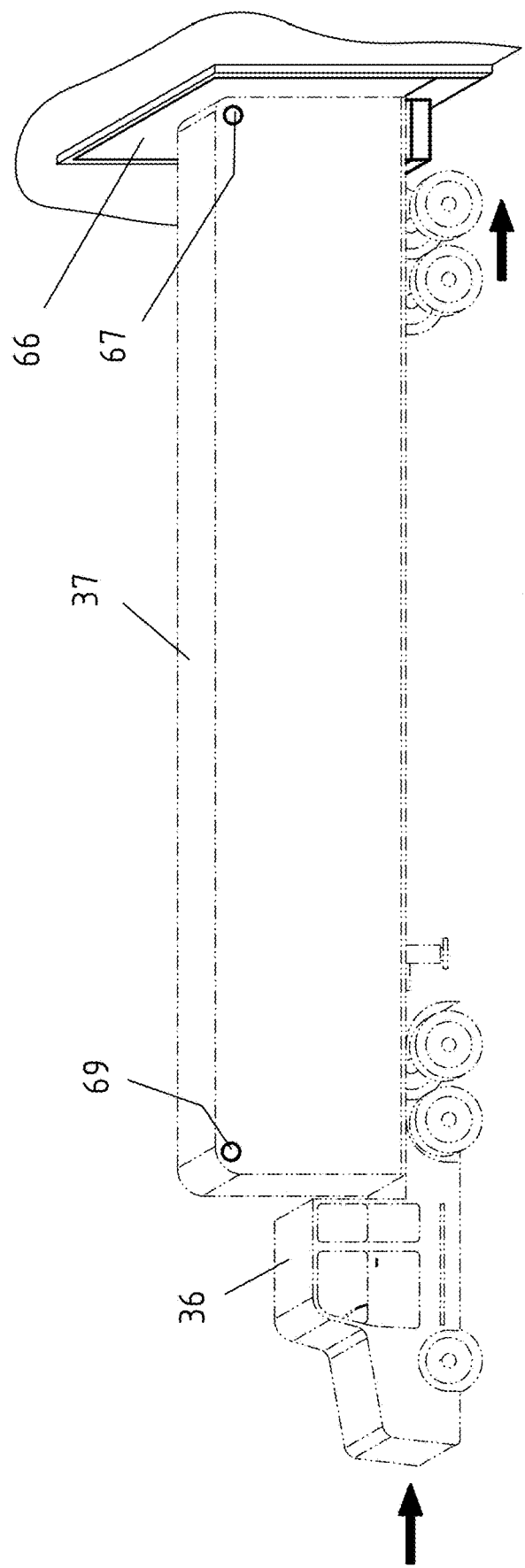
FIG. 27 is an isometric view of a truck and an electric trailer parked on a warehouse dock.
Figure 28:
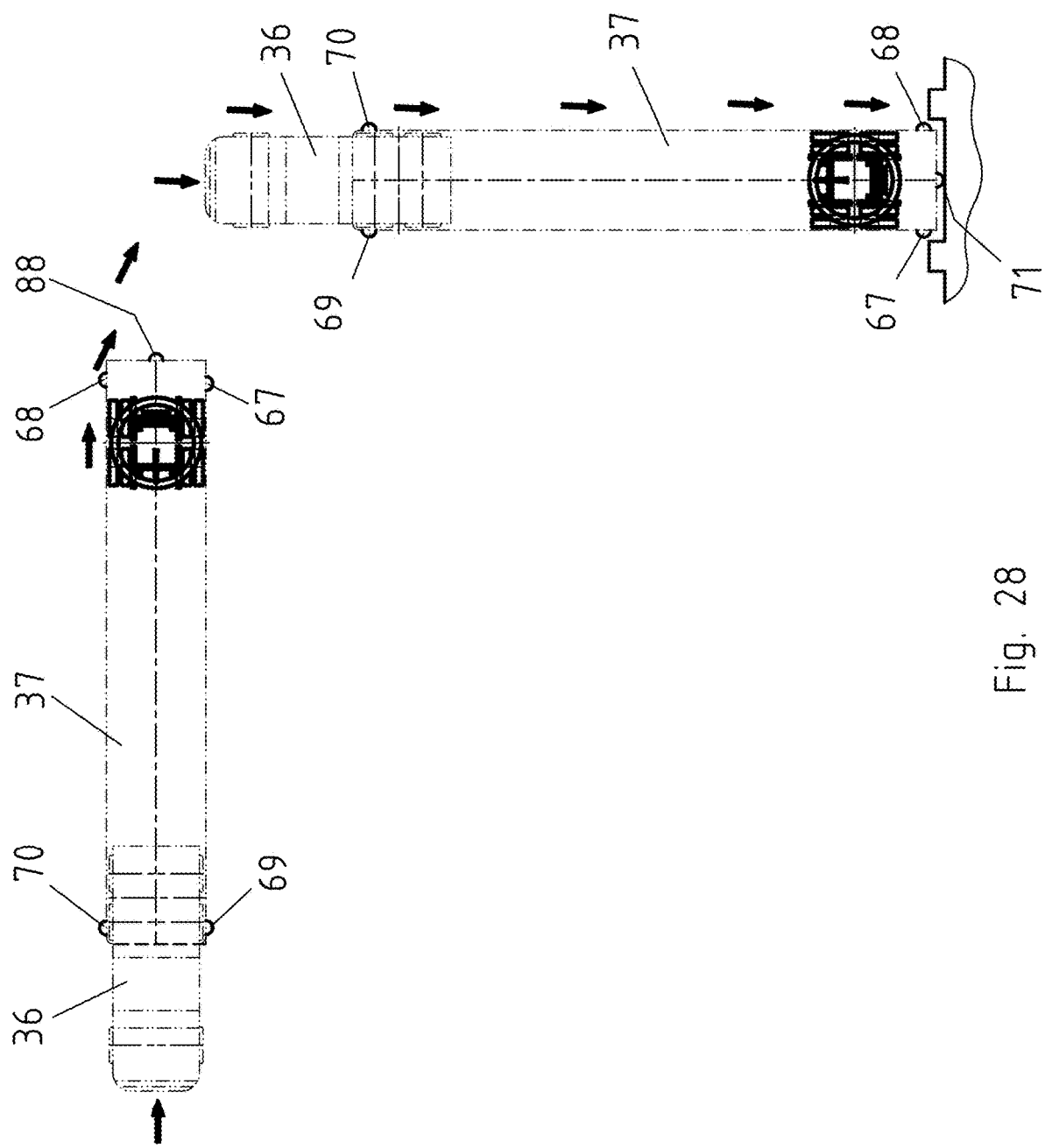
FIG. 28 is a top view showing a truck with a very long electric trailer in the initial and final position of a back parking on a warehouse dock.
Figure 29:
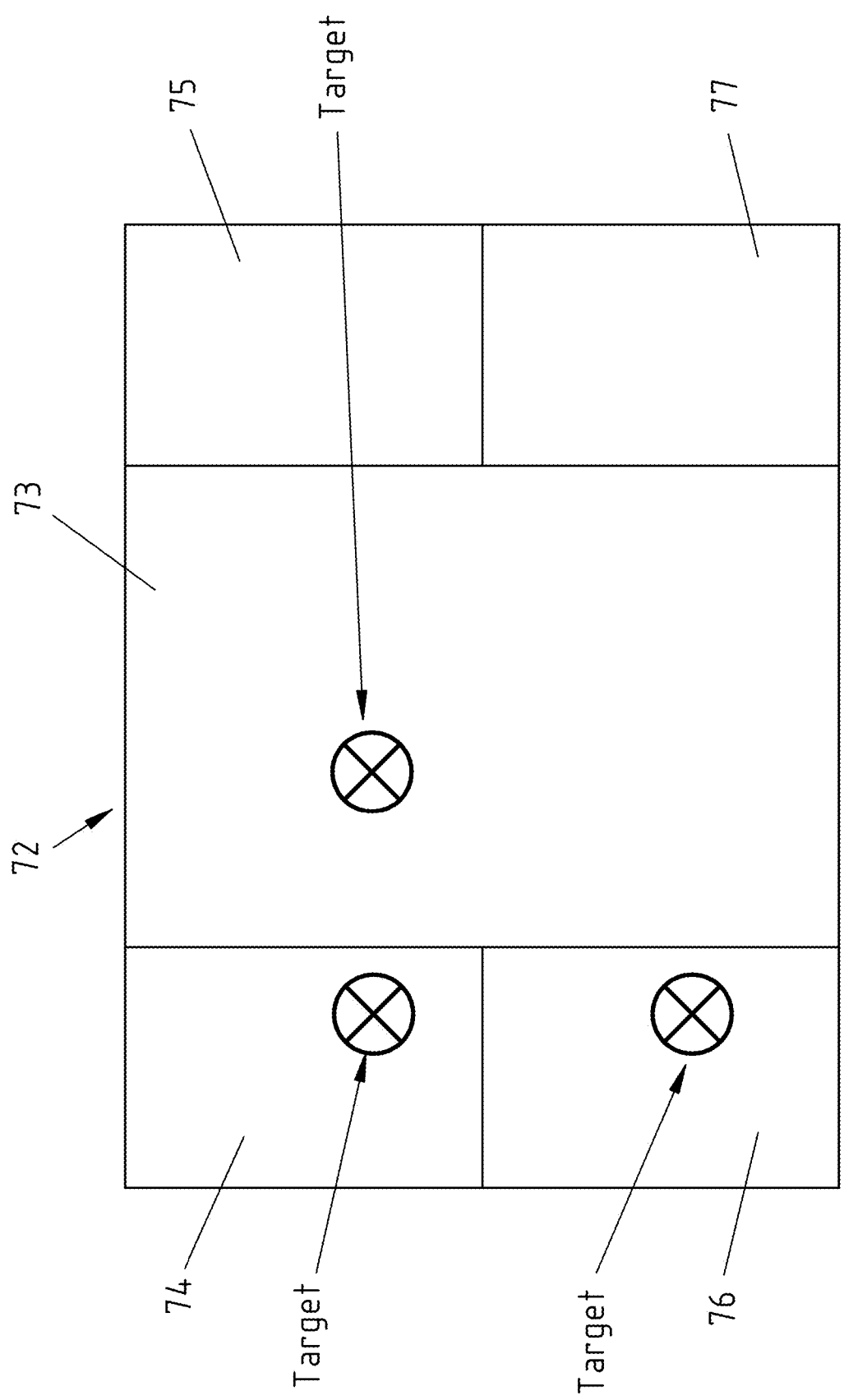
FIG. 29 is shown the board screen of the vehicle when the driver shifts up for automatic backwards drive.
Figure 30:
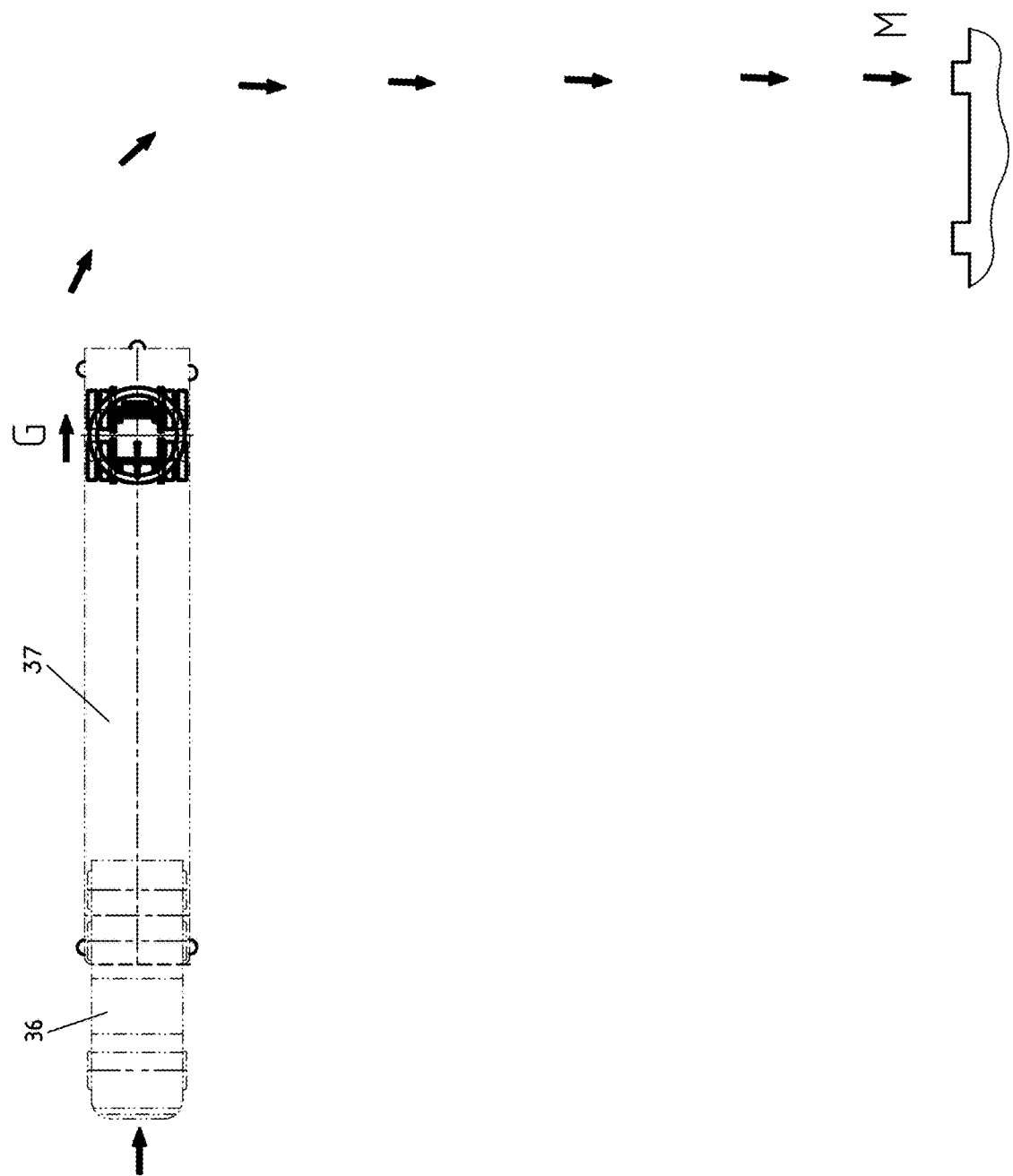
FIG. 30 is a top view showing a truck with a very long electric trailer in the initial position of a back parking on a warehouse dock.
Figure 31:
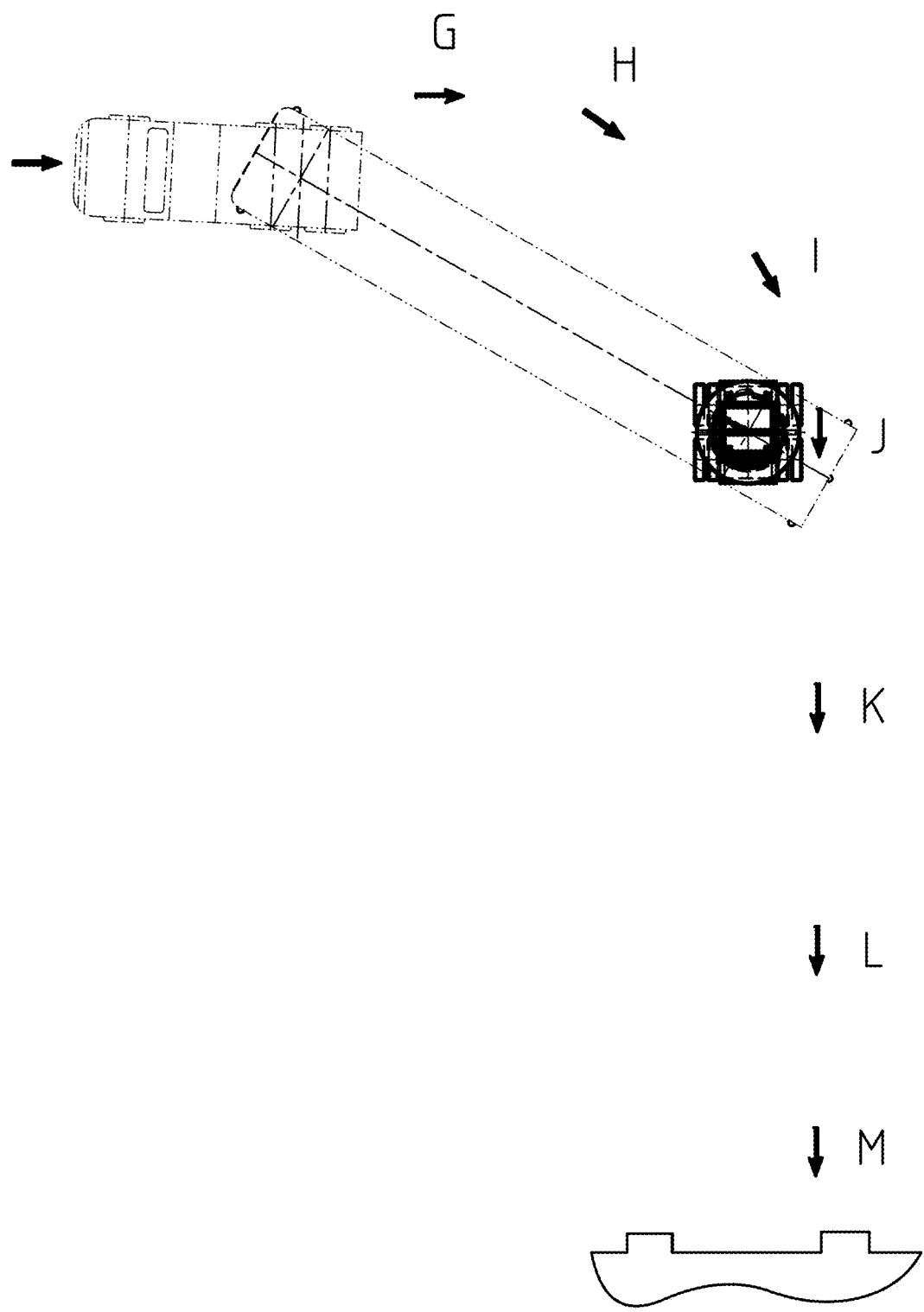
FIG. 31 is a top view showing a truck with a very long electric trailer in the J position of a back parking on a warehouse dock.
Figure 32:
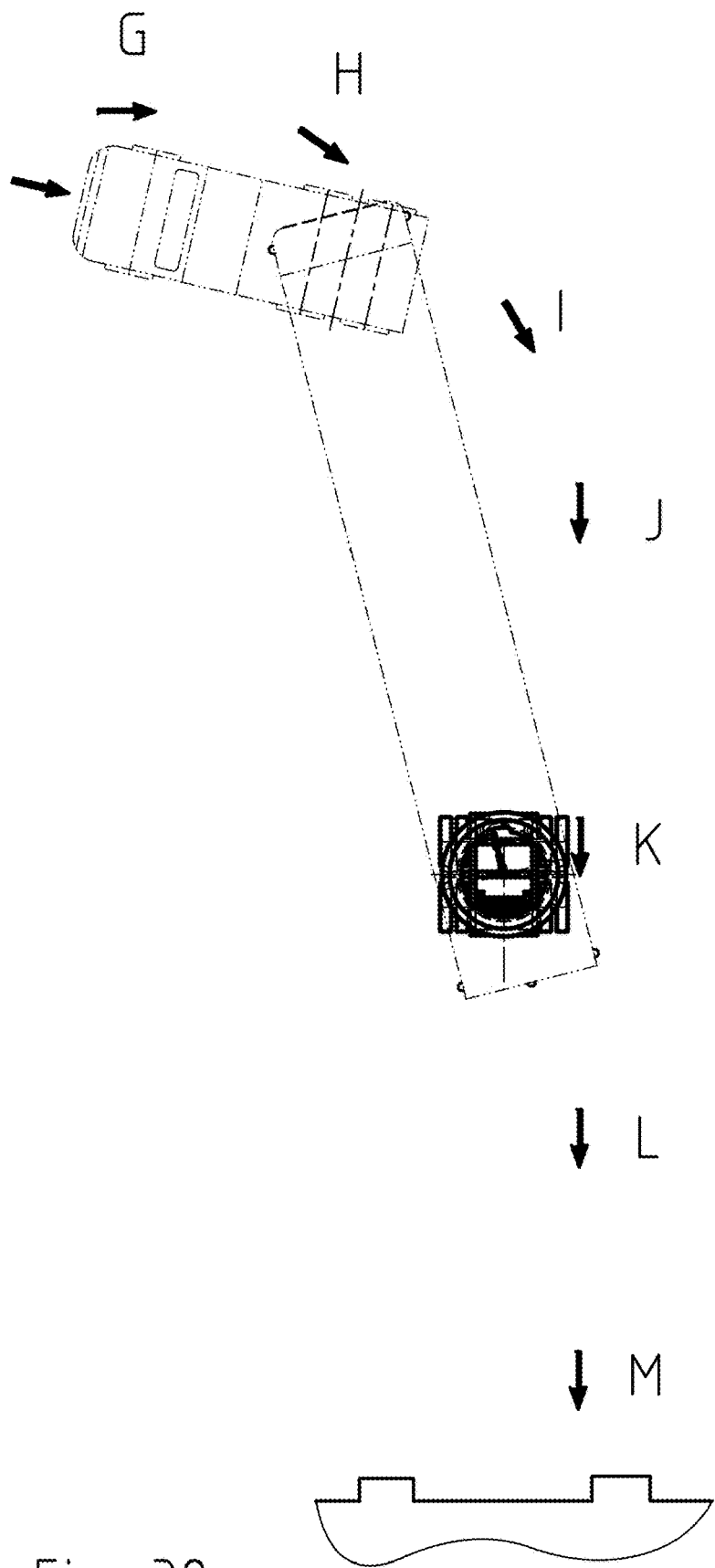
FIG. 32 is a top view showing a truck with a very long electric trailer in the K position of a back parking on a warehouse dock.
Figure 33:
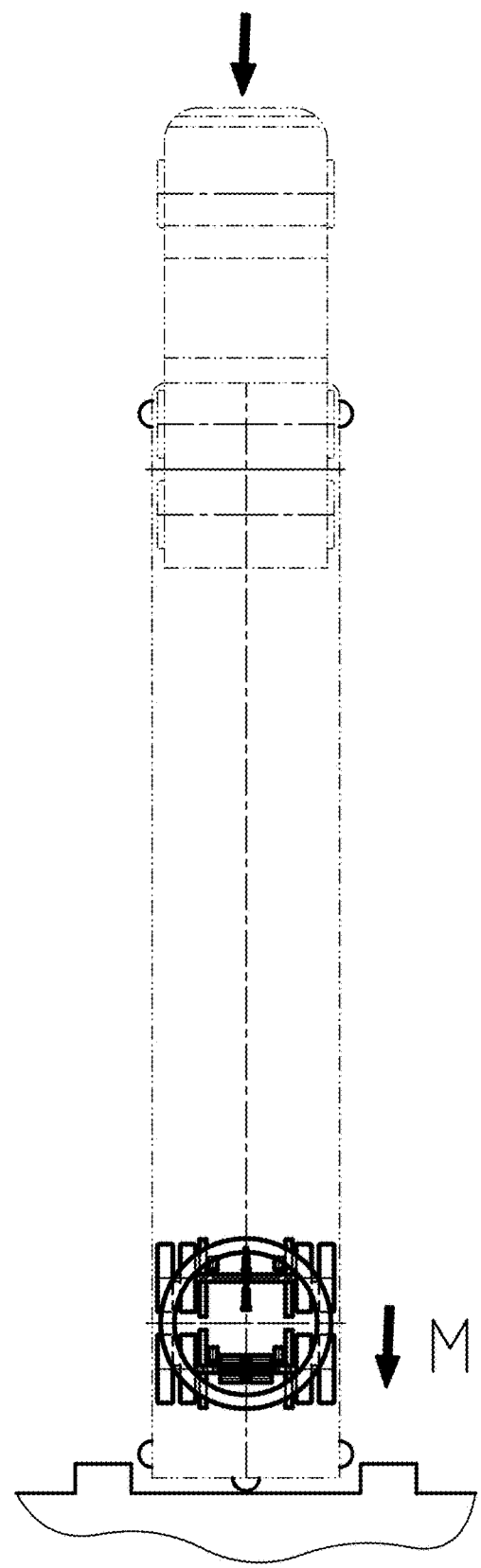
FIG. 33 is a top view showing a truck with a very long electric trailer in the final (M) position of a back parking on a warehouse dock.
Figure 34:
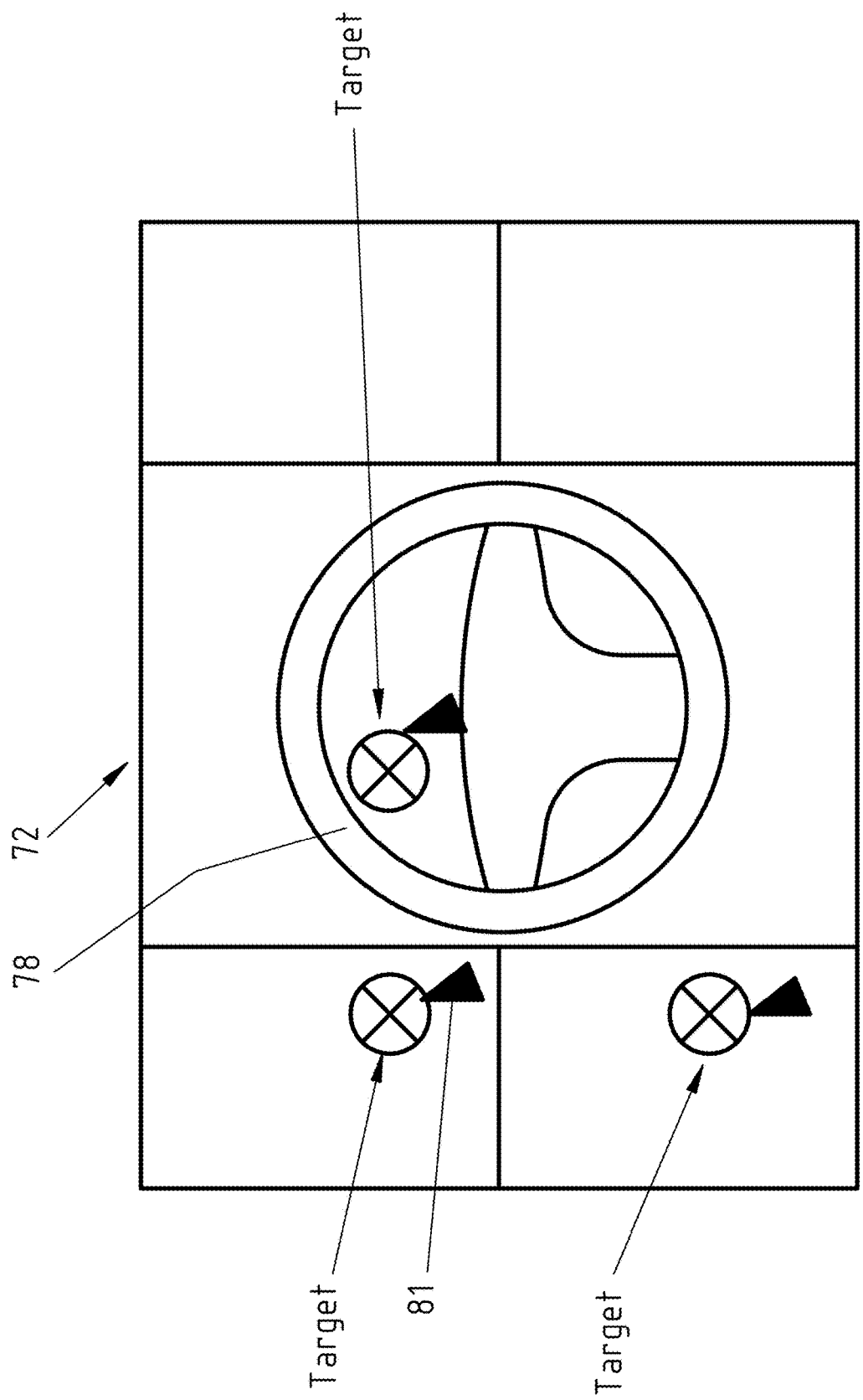
FIG. 34 is shown the board screen of the vehicle when the driver shifts up for backwards drive and manual control.
Figure 35:
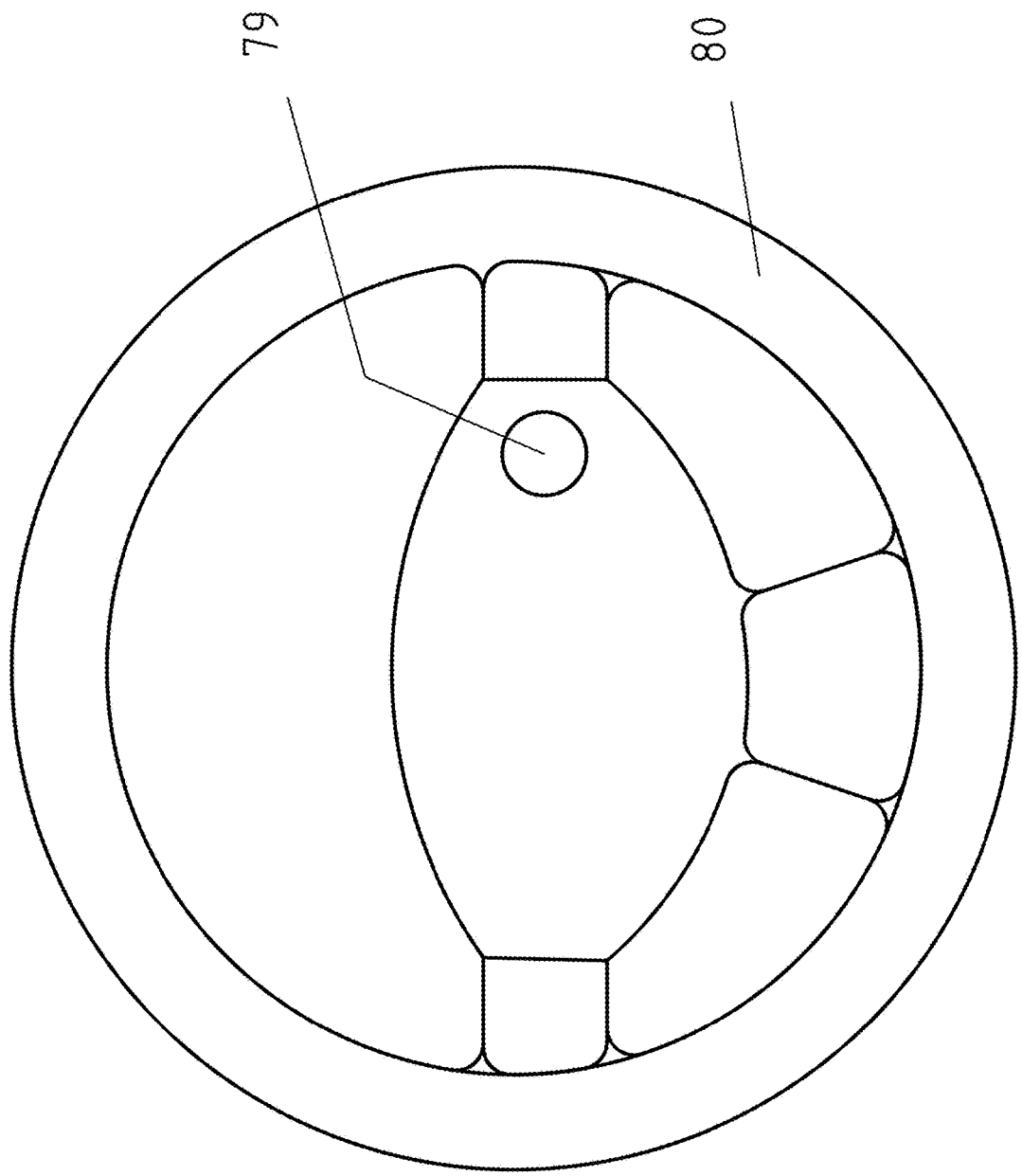
FIG. 35 is a top view of the steering wheel of the vehicle integrating a mouse kind of device.

The pivoting rear tires train of the very long trailers helps a lot on back driving and back parking of the trailer as well. As illustrated in FIG. 27, the truck 36 and the trailer 37 parking on a warehouse dock 66 has to be very precisely (within +/−5"). In order to do this accurate back parking, the trailer is equipped with a plurality of cameras as following (see FIG. 27 and FIG. 28): one of each side on the lateral walls of the trailer 67 and 68 on the rear and 69 and 70 on the front of the trailer and another one 71 on the middle of the rear wall of the trailer. These images taken by the plurality of cameras will pop-up on a board screen 72, which is shown in FIG. 29. On the board screen 72 there is a dedicated area for each camera image, as following: in the centre of the board screen, the biggest one, will be the image area 73 taken by the camera 71 positioned in the middle of the rear wall of the trailer, and on the left and right side of the boarding screen 72, in the up locations will be the image areas 74 and 75 taken by the cameras 69 and 70 and on the lower location will be the image areas 76 and 77, taken by the cameras 67 and 68. Based on these images, which will pop-up on the board screen 72 of the vehicle when the driver shifts up for backwards drive, the driver may choose the target position by touching the screen on the most appropriate minimum two images. The computed power control system of the vehicle will analyze the target position and will calculate the best trajectory of the powered rear tires with their respective speed and the trajectory of the steering wheels of the truck and by the decision of the driver to cease the control and start the back parking maneuverings in an automate mode, the computed power control system of the vehicle takes the control and moves the truck and the trailer to the target. In FIG. 30 are shown the successive positions of the truck 36 and the trailer 37 on the back parking maneuverings, moving from position G to position M. In FIG. 31, FIG. 32 and FIG. 33 is shown the truck and the trailer in the J, K and M position. The driver may intervene any time and take the control of the vehicle and the trailer, switching in manual mode. In this situation, (manual mode operation) when the driver takes control of the powered rear tires train on the trailer, on the board screen 72 of the truck it's popping-up a virtual steering wheel 78 of the rear tires train and the images aiming the target like in FIG. 34. Using a ball mouse kind of device 79 installed on the steering wheel 80 of the truck, see FIG. 35, the driver moves the virtual steering wheel 78 of the rear tires train using the prompter 81, controlling the trailer path, without taking out his hands from the truck's steering wheel 80. Based on the virtual steering wheel position of the rear tires train, the computed power control system of the vehicle calculates automatically the speed of each powered rear tires train wheel, making sure the trailer will reach the target.

On the board screen of the truck is permanently shown the status of the rear tires train locking and unlocking mechanism, the driver knowing in any moment if it is locked or not. In the locking position it will be green colour and on the unlocked position it will change the colour turning red. The unlocked position of the locking pin may be signalled by a sound signal, beeping-up.

The procedures are similar any time the driver wants to take control of the powered rear tires train, driving forwards of backwards. Therefore, when the truck and trailer turn, based on the information received by the computed power control system of the vehicle from the GPS system and from the plurality of cameras installed on the trailer, the driver has to decide if he/she keeps the control or give the control to the computed power control system of the vehicle (setting ion automate or manual mode the system). Ones the decision is taken, the driver turns on or off the control of the computed power control system of the vehicle, defining the mode on which the truck and the trailer operate in this moment—automate or manual. Also, the driver turns ON cameras in order to have the best information of the environment around to the truck and the trailer.

Depending on each actual situation, the driver may decide which mode of operation—automate or manual—is the most appropriated and set the system accordingly. In the automate mode, the driver ceases the control to the computed power control system of the vehicle, which operates the truck and the trailer. In the manual mode, the driver takes the control, operating the truck and the trailer by him/her self.

I claim:

1. An intelligent pooling vehicle and trailer system characterized by the capacity to avoid off-tracking and to increase turns and parking maneuverings ability, comprising:
    an electric powered trailer (IEPT);
    wherein the IEPT has a pivoting rear tires train;
    wherein the II-PT has an independent electric power-train on each side of the II-PT;
    wherein the IEPT has a plurality of camera;
    wherein the II-PT is powered by a battery.

2. An intelligent pooling vehicle and trailer system described in claim 1, wherein the said intelligent pooling vehicle and trailer system further comprises:
    an pooling vehicle (IPV);
    wherein the IPV is configured to pool the said IEPT; and
    wherein the IPV is configured to lead the entire said intelligent pooling vehicle and trailer system.

3. An intelligent pooling vehicle and trailer system described in claim 1, wherein the said pivoting rear tires train is working in active pivoting mode, when the pivoting rear tires train is set to be able to pivot.

4. An intelligent pooling vehicle and trailer system described in claim 1, wherein the said pivoting rear tires train is working in locked pivoting mode, when the pivoting rear tires train is set on a locked position for a straight drive.

5. An intelligent pooling vehicle and trailer system described in claim 1, wherein the said pivoting rear tires train comprising:
    a tandem rear tires train (TRTT):
    a pivoting rear tires tires train mechanism (PRTTM).

6. An intelligent pooling vehicle and trailer system described in claim 5 wherein the said tandem rear tires train (TRTT) comprising:
    a tandem pivoting frame;
    an electric powered axle;
    at least a non-powered axle;
    a suspension system.

7. An intelligent pooling vehicle and trailer system described in claim 6, wherein the said electric powered axle comprises:
    an independent powered axis on each side of the IEPT, powering each rear tire of the each side of the IEPT, controlled by the said control system;
    a non-moving component attached too the said tandem pivoting frame via the said suspension system, supporting the said independent powered axis via rotating bearings;
    at least a tire connected to each of the said independent powered axis and to the said frame.

8. An intelligent pooling vehicle and trailer system described in claim 7 wherein the said independent powered axis on each side of the IEPT comprises:
    a power axle connected to the said tire and supported by the said bearings;
    an electric motor;
    a gear box connecting the said power axle to the said electric motor;
    an inverter, electrically connected to the said electric motor and the said battery.

9. An intelligent pooling vehicle and trailer system described in claim 5 wherein the said pivoting rear tires train mechanism (PRTTM) comprises:

- the said tandem pivoting frame;
- a supporting ring attached to the said structure of the said IEPT;
- a pivoting ring attached to the said tandem pivoting frame turning concentrically with respect to the said supporting ring;
- two semi-rings solidly attached to the pivoting ring capable to slide on the supporting ring and also to keep together the said supporting ring and the said pivoting ring during pivoting maneuverings;
- a locking and unlocking mechanism, which locks and unlocks the said pivoting rear tires train when necessary, controlled by the control system.

10. An intelligent pooling vehicle and trailer system described in claim 9, wherein the said locking and unlocking mechanism comprises:

- a sliding locking pin, solidly attached to the said structure of the said IEPT;
- a locking slot created into the said pivoting ring, which receives the said sliding locking pin when the mechanism is locked;
- an elastic element pushing the said sliding pin into the said locking slot, capable to keep in place the said locking pin into the said locking slot when the said locking mechanism is locked and to allow to unlock the said locking mechanism during the pivoting time;
- an actuator controlled by the control system, which moves the said locking pin out of the said locking slot in order to unlock the said pivoting ring during the pivoting time.

11. An intelligent pooling vehicle and trailer system described in claim 10, wherein the said elastic element is a compression spring.

12. An intelligent pooling vehicle and trailer system described in claim 10, wherein the said actuator is a pneumatic cylinder.

* * * * *